United States Patent
Tsuruta et al.

[11] Patent Number: 5,696,672
[45] Date of Patent: Dec. 9, 1997

[54] PREVIEW CONTROL APPARATUS

[75] Inventors: Kazuhiro Tsuruta; Hiroshi Nakamura, both of Tsukuba, Japan

[73] Assignee: Kabushiki Kaisha Yaskawa Denki, Fukuoka, Japan

[21] Appl. No.: 140,088

[22] PCT Filed: Jan. 14, 1993

[86] PCT No.: PCT/JP93/00049

§ 371 Date: Nov. 1, 1993

§ 102(e) Date: Nov. 1, 1993

[87] PCT Pub. No.: WO93/20489

PCT Pub. Date: Oct. 14, 1993

[30] Foreign Application Priority Data

| Mar. 31, 1992 | [JP] | Japan | 4-108683 |
| Aug. 18, 1992 | [JP] | Japan | 4-242654 |
| Oct. 19, 1992 | [JP] | Japan | 4-306424 |
| Oct. 19, 1992 | [JP] | Japan | 4-306425 |
| Oct. 21, 1992 | [JP] | Japan | 4-308245 |

[51] Int. Cl.$^6$ .................. G05B 13/02
[52] U.S. Cl. .................. 364/148; 364/164; 364/149
[58] Field of Search .................. 364/148–152, 364/164, 165, 178, 179, 183, 160–163; 318/561

[56] References Cited

U.S. PATENT DOCUMENTS

| 4,358,822 | 11/1982 | Sanchez | 364/151 |
| 5,119,287 | 6/1992 | Nakamura et al. | 364/148 |
| 5,220,265 | 6/1993 | Araki et al. | 364/148 |
| 5,379,210 | 1/1995 | Gruji et al. | 364/148 |

FOREIGN PATENT DOCUMENTS

| 61-256405 | 11/1986 | Japan |
| 62-118405 | 5/1987 | Japan |
| 63-10201 | 1/1988 | Japan |
| 63-98703 | 4/1988 | Japan |
| 63-163505 | 7/1988 | Japan |
| 1106103 | 4/1989 | Japan |
| 415706 | 1/1992 | Japan |

Primary Examiner—Reba I. Elmore
Assistant Examiner—Thomas E. Brown
Attorney, Agent, or Firm—Jordan and Hamburg

[57] ABSTRACT

A preview control apparatus uses a previously known future target value to control, among other things, robots and industrial machinery. Fast, highly accurate control is achieved in accordance with a target instruction without a learning process. The preview control apparatus produces a control input, outputted to a control object every predetermined sampling period, in a manner that a future deviation estimate obtained from a model of the control object becomes minimized to coincide the output of the control object with the target instruction. The preview control apparatus includes inputs for the future target instruction and a control object output and a memory for storing the future target instruction, a preview control constant and at least one past control input. An arithmetic unit calculates a deviation according to the difference between the target instruction and the control object output. The arithmetic unit further calculates a control input to be outputted to the control object, in such a manner that an evaluation function including at least a squared weighting of a future deviation estimate becomes minimum, using the future target instruction, the control object output, the past control input, the deviation, and the model of the control object.

43 Claims, 24 Drawing Sheets

PREVIEW CONTROL APPARATUS

TECHNOLOGICAL FIELD

The present invention relates to a preview control apparatus for, among other things, robots and industrial machinery, where a future target value is already known.

BACKGROUND ART

In conventional design methods with repeat target values, using the control deviation occurring one cycle previously along with the control deviation occurring at the cycle previous to that cycle at a time t' with respect to the current time t, the deviation for the time from the occurrence of the one previous cycle and the deviation from the time t', to decide the control input for this time, although particularly useful, is not widely used.

In order to solve this kind of problem, in U.S. Pat. No. 5,119,287, the increment was corrected for each sample taken, and then by using the deviation for M samples taken from the previous sample, the current deviation, the N−1 past corrected increment, the operation amount for the previous sample, and constants decided beforehand, an algorithm was obtained to decide only by using arithmetic the amount of control for a periodic target value which is most suitable for the tracking.

In another method, with a control object having a target value with a pattern which repeats itself periodically, the control deviation for the period during the current and past cycles, the past increment correction, information concerning the motion characteristics of the control object (the indicial response) and the control input or information classified with these, are used with each of the sampling times for every control input to select the squared weighting of the future control deviation preview to be minimum. By these methods, a control algorithm for the tracking is obtained where the control amount is that most suited to the tracking. This can be realized by a mainly digital circuit or a microcomputer so that it becomes possible to have a control system which can produce much more highly accurate tracking.

However, the learning control method disclosed in U.S. Pat. No. 5,119,287 requires a learning process. Also, a large number of data memories are needed as it is necessary to have deviations for past cycles.

It is therefore the basic object of this invention to propose a preview control method which provides highly accurate tracking at high speeds according to a target instruction without a learning process being required.

Further, more specifically, this invention has the following objects.

(i) To reduce the number of data samples.

(ii) To obtain a control input without using a control object output.

(iii) To reduce the amount of memory required and shorten the amount of calculation time.

(iv) To carry out tracking with the most suitable target instruction, even in control systems where the output increment is detected K samples late.

(v) To provide a preview control apparatus with the target instruction most suitable for tracking without vibrations occurring in the response.

(vi) To provide a preview control apparatus with the target instruction most suitable for tracking, even in the case where a control input increment decided at a current time i is used one sample later at a time i+1.

(vii) To provide a preview control apparatus with the target instruction most suitable for tracking, which does not vibrate even for very high frequency instructions or when there is external disorder.

(viii) To provide an incremental type preview control apparatus with the target instruction most suitable for tracking, which does not vibrate even for very high frequency instructions or when there is disturbance and which achieves this while requiring less memory and a smaller amount of calculation time.

(ix) To provide a preview control apparatus which can be applied to a control object which has two constituent integral portions.

(x) To provide a preview control apparatus in which detrimental effects due to model errors are minimum.

(xi) To provide a preview control apparatus corresponding to a late-detected control target output where the amount of calculations carried out during each sampling period is small.

(xii) To provide a preview control apparatus which corresponds to changes in the characteristics of a control object, even if before that point in time the operator of the equipment did not know the control object model or only set the target model once.

(xiii) To provide an incremental type preview control apparatus as in the eighth embodiment, but which involves few integration and summing calculations, less memory and a shorter calculation time.

(xiv) To provide a preview control apparatus as in the tenth object, but which requires little memory and less calculation time.

(xv) To provide a preview control apparatus as in the seventh object, but which can be applied to the case where speed control can be carried out by deciding an acceleration or torque instruction from a target speed instruction.

(xvi) To provide a preview control apparatus as in the sixth object, but where little memory and less calculation time is required.

DISCLOSURE OF INVENTION

In order to solve the problems encountered in the prior art, the present invention provides a preview control apparatus for deciding a control input, which is to be outputted to a control object every predetermined sampling period in such a manner that a future deviation estimate obtained from a model of the control object becomes minimum, so that the output of the control object coincides with a target instruction, characterized in that the preview control apparatus comprises:

(a) means for inputting a future target instruction and a control object output;

(b) means for storing the future target instruction, a preview control constant and a past control input;

(c) means for obtaining a tracking deviation according to the difference between the target instruction and the control object output; and (d) means for calculating a control input to be outputted to the control object, in such a manner that an evaluation function including at least the squared weighting of the future deviation estimate becomes minimum, according to the future target instruction, the control object output, the past control input, the deviation, and the model of the control object.

BEST MODE FOR CARRYING OUT THE INVENTION

The following is a detailed description of the present invention based on the embodiments.

Figure 1:
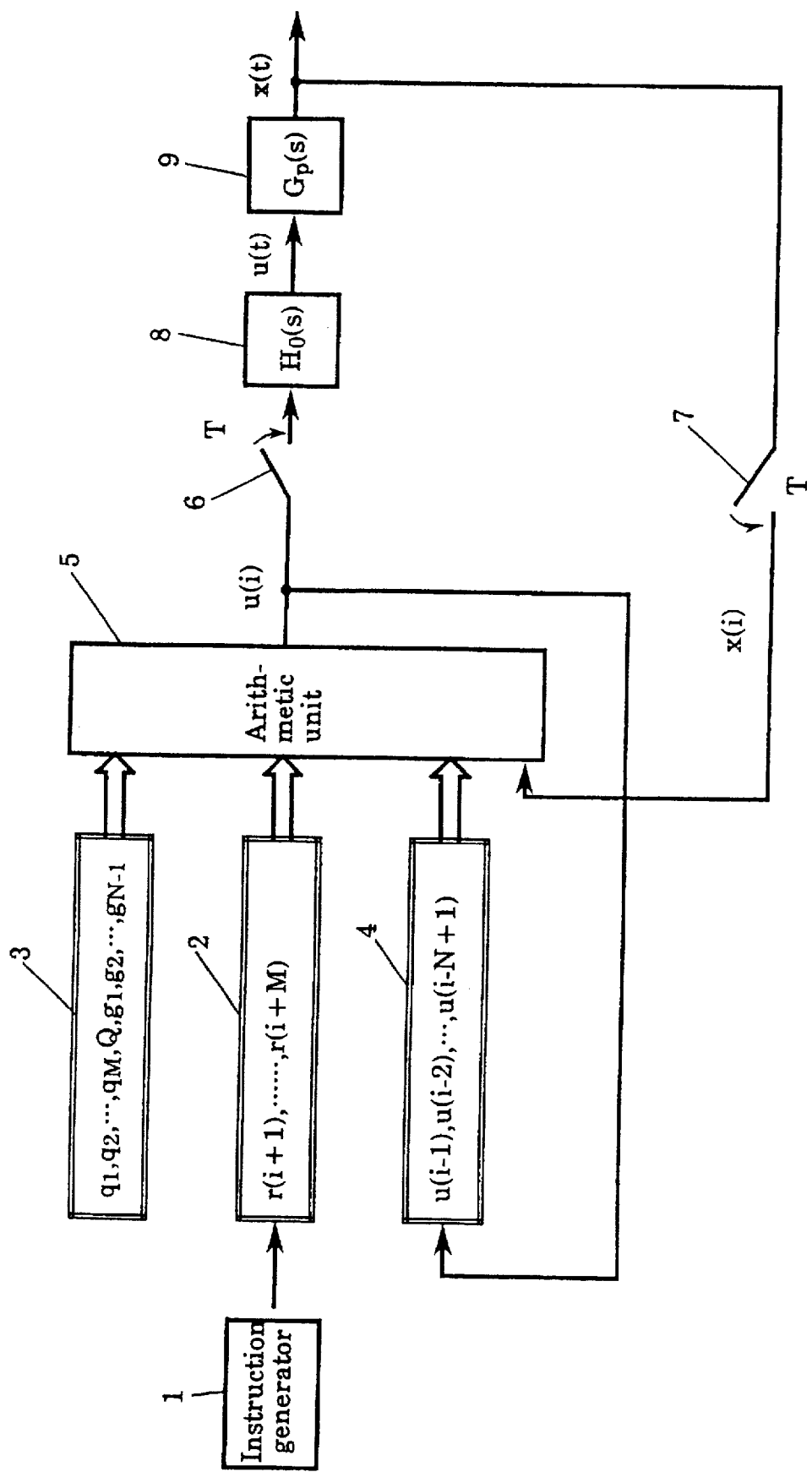
FIG. 1 is a block diagram of the structure of a first embodiment of the present invention.

FIG. 1 is a block diagram of the structure of an embodiment to attain the first object of said present invention. In this diagram, the numeral 1 indicates an instruction generator, the numeral 2 indicates the memory for the future target instruction r(j) (j=i+1, i+2, . . . , i+M), the numeral 3 indicates the memory for the constants $q_1, q_2, \ldots, q_M$, Q, $g_1, g_2, \ldots, g_{N-1}$, and the numeral 4 indicates the memory for the past control input u(j) (j=i−1, i−2, . . . , i−N+1). Also, the numeral 5 indicates the arithmetic unit where the control input u(i) for this time is calculated according to the equation:

$$u(i) = \sum_{m=1}^{M} q_m r(i+m) - Qx(i) - \sum_{n=1}^{N-1} g_n u(i-n) \quad (1\text{-}1)$$

The numerals 6 and 7 indicate samplers which commence sampling upon a sampling period T, and the numeral 8 indicates a hold circuit. The numeral 9 indicates the control object, with an input u(t) and an amount subjected to control at the output x(t).

Blocks 2 to 8 represent the control system which is the section usually known as the "controller" section and can be easily realized by a mainly digital circuit or microcomputer. Any kind of preferred control system can be included as the control system within the control object 9 (i.e. a compensator).

Herein, deductions are made from equation (1-1).

Figure 2:
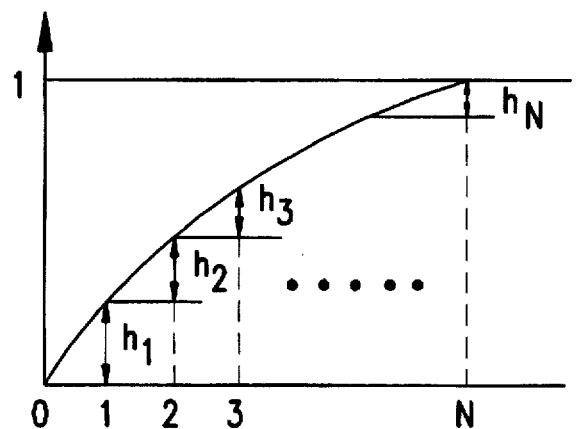
FIG. 2 is a graph of an example of the step response for a control object.

Sampling is carried out only for the first N step responses for the control object 9. After this, if it is approximated that the increasing portion $h_K$ is reduced by the damping ratio P, the pulse propagation function can be shown to be;

$$G(z) = \{b_1 z^{-1} + b_2 z^{-2} + \ldots b_N z^{-N}\}/(1 - Pz^{-1}) \quad (1\text{-}2)$$

$$b_k = h_k - Ph_{k-1}$$

Where $h_j$ (j=1, 2, . . . , N), provided that the unit step response sample $H_j$ is increasing, as is shown in FIG. 2, it can be shown that $h_j = H_j - H_{j-1}$. ("Digital System Control" p224–p225 published by Shokodo, written by Seinosuke Narita)

It follows that the output x(i) with respect to time i can be written as;

$$x(i) = Px(i-1) + \sum_{n=1}^{N} b_n u(i-n)$$

Herein, if the control input $u(j)$ ($j=i+1, i+2, \ldots$) at time $i+1$ is assumed to be the same as $u(i)$, an output estimate $x^*(i+m)$ for time $i+m$ can be considered from the following equation;

$$x^*(i+m) = P^m x(i) + H_m u(i) + \qquad (1\text{-}3)$$

$$\sum_{j=2}^{m+1} \sum_{k=j}^{N} P^{m-j+1}(h_k - Ph_{k-1})u(i-k+j-1)$$

Accordingly, the estimation of future deviation $e^*(i+m)$ becomes;

$$\begin{aligned} e^*(i+m) &= r(i+m) - x^*(i+m) & (1\text{-}4) \\ &= r(i+m) - P^m x(i) - H_m u(i) - \\ & \sum_{j=2}^{m+1} \sum_{k=j}^{N} P^{m-j+1}(h_k - Ph_{k-1})u(i-k+j-1) \end{aligned}$$

Figure 3:
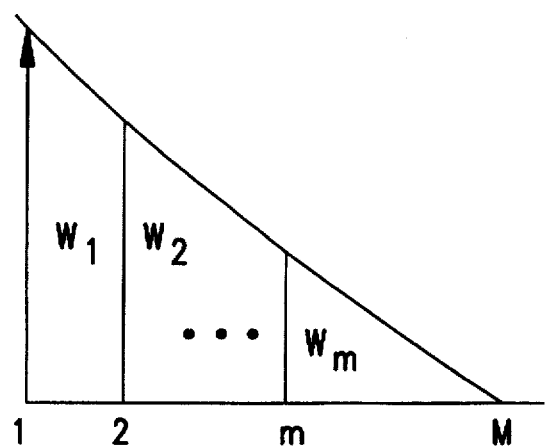
FIG. 3 is a graph of an example of the weighting $W_m$ for this embodiment.
Figure 4:
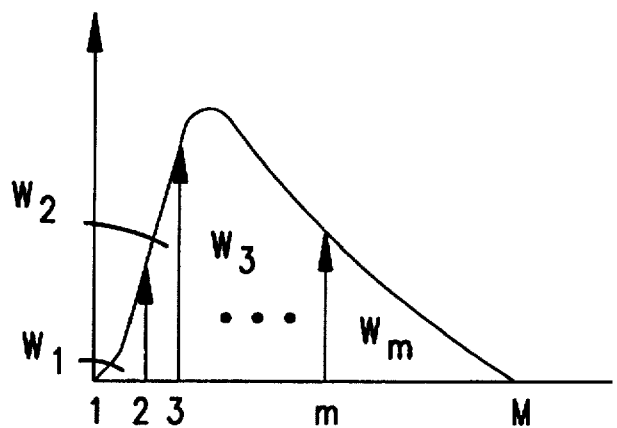
FIG. 4 a graph of a further example of the weighting $W_m$ for this embodiment.

Now, the weighted square sum $J$ of the future deviation estimates $$J = \sum_{m=1}^{M} W_m \{e^*(i+m)\}^2 \qquad (1\text{-}5)$$

is taken as the evaluation function, and the control input $u(i)$ is chosen so that $J$ is at a minimum. Herein, $W_m$ is the weighting coefficient for the future deviation estimate $e^*(i+m)$ and this example is shown in FIG. 3 and FIG. 4.

The control input $u(i)$ for making the evaluation function $J$ a minimum can be derived from equation (1-1) as being;

$$\partial J/\partial u(i) = 0 \qquad (1\text{-}6)$$

provided that;

$$q_m = W_m H_m / \sum_{j=1}^{M} W_j H_j^2$$

$$Q = \sum_{m=1}^{M} q_m P^m$$

$$g_n = \begin{cases} \sum_{k=1}^{M} V_k b_{k+n} & (n \le N-M) \\ \sum_{k=1}^{N-n} V_k b_{k+n} & (n > N-M) \end{cases}$$

$$V_k = \sum_{m=k}^{M} P^{m-k} q_m$$

$$b_k = h_k - Ph_{k-1}$$

Also, as is shown in FIG. 2, $q_m$, $Q$ and $g_n$ measure the control object step response, and by assigning a suitable weighting function $W_m$, this can be measured beforehand.

Figure 5:
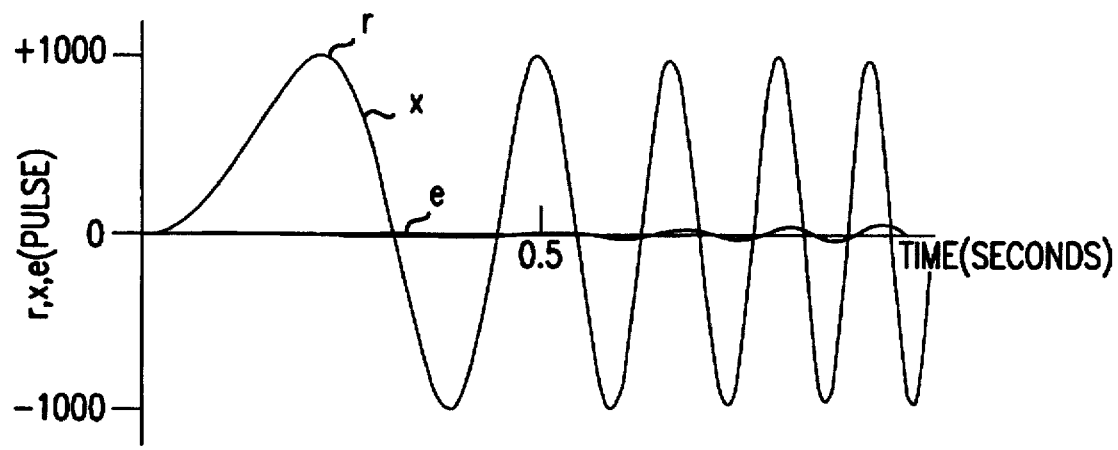
FIG. 5 is a graph describing the operation of this embodiment.
Figure 6:
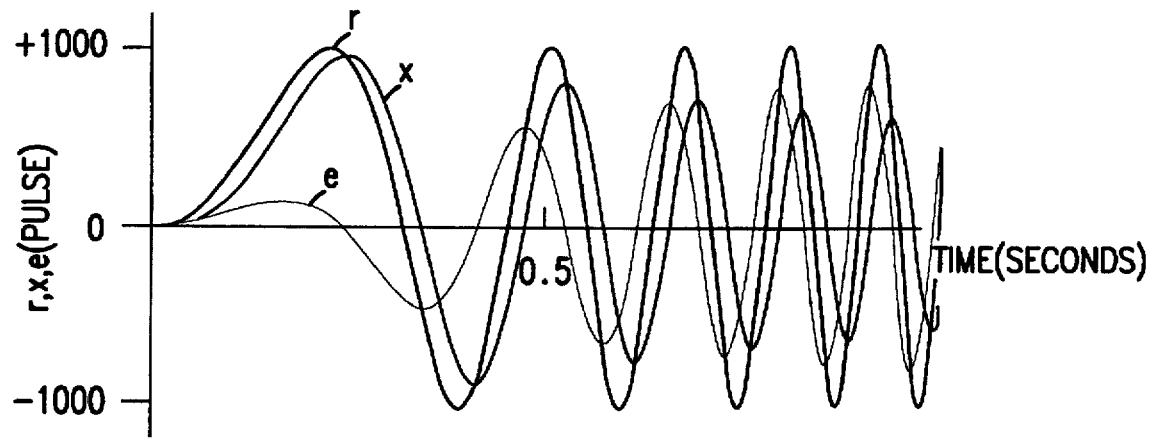
FIG. 6 is a further graph describing the operation of this embodiment.
Figure 7:
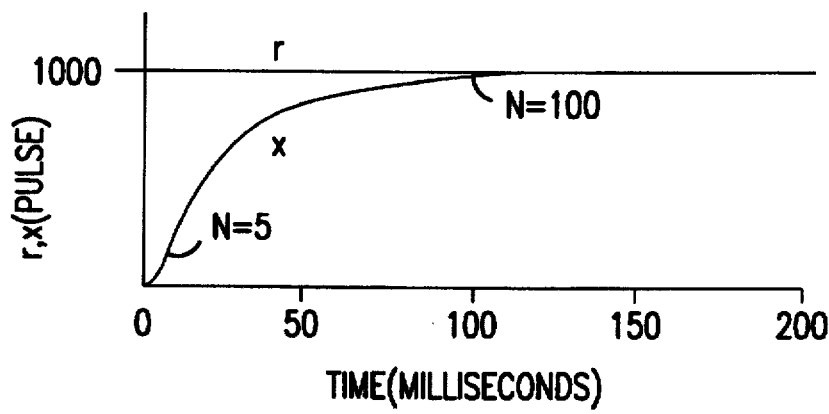
FIG. 7 is another graph describing the operation of this embodiment.

FIG. 5 is a view of an example of the operation for the case where this invention is used with a position control system for a D.C. servo motor and FIG. 6 is a view of an example of the operation of a conventional position control system. In FIG. 5 and FIG. 6, the character r represents the object position instruction for the motor, x indicates the response and e indicates the deviation. FIG. 7 shows the step response and, whereas with the conventional method (for example, Japanese Unexamined Patent Publication No. 62-118405) it was necessary for N to be 100, with the present invention N need only be 5.

In the method described above, according to this embodiment, using the future target instruction and control object output, the past control input and previously set constants, according to simple four-rule arithmetic, an estimation control system with a suitable response for the target instruction can be realized and the sampling period can be greatly reduced.

Next, a description of an embodiment of a preview control apparatus for attaining a second object of the aforementioned present invention will be given.

Figure 8:
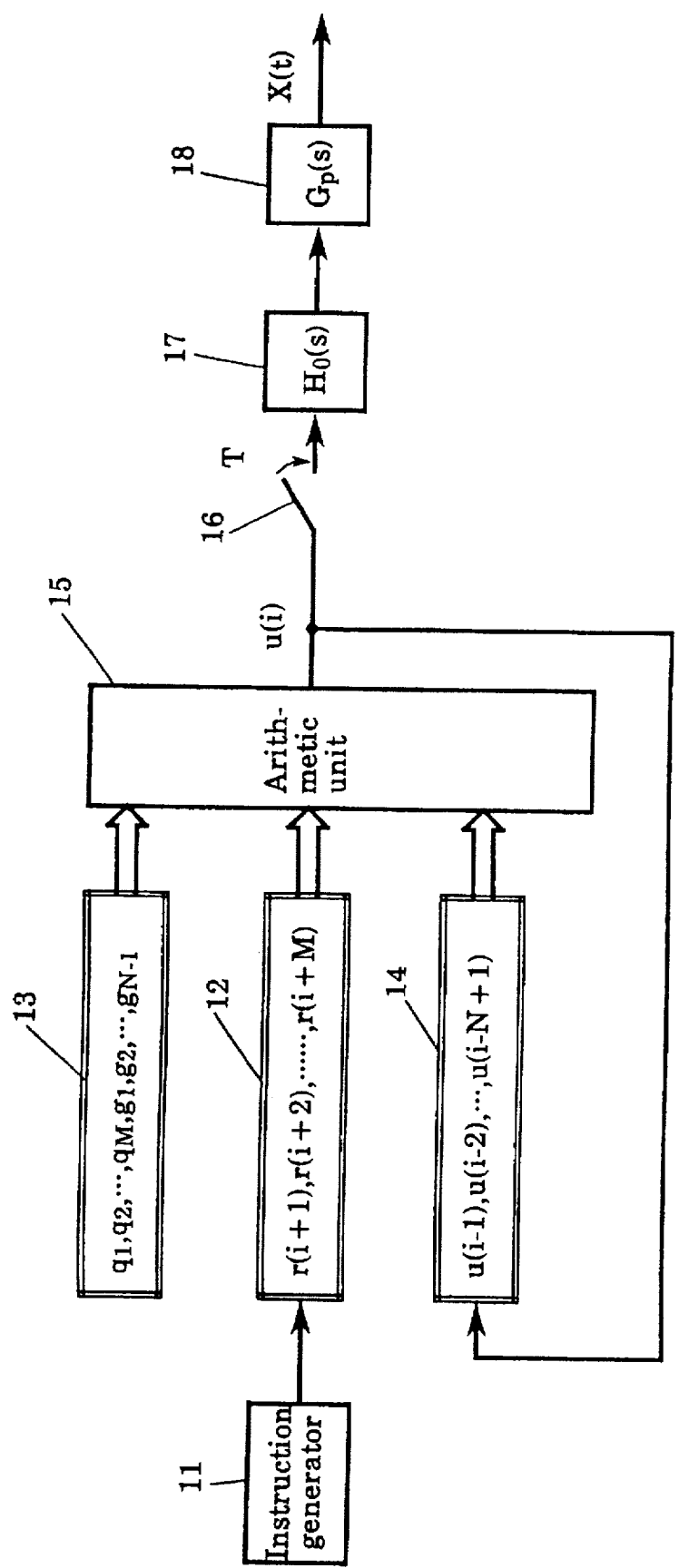
FIG. 8 is a block diagram of the structure of a second embodiment of the present invention.

FIG. 8 is a block diagram of the structure of this embodiment. In the same diagram, the numeral 11 represents the instruction generator, numeral 12 the memory for the future target instruction $r(j)$ ($j=i+1, i+2, \ldots, i+M$), numeral 13 represents the memory for the constants $q_1, q_2, \ldots, q_M$, $g_1, g_2, \ldots, g_{N-1}$ and the numeral 14 represents the memory for the past control input $u$ ($j=i-1, i-2, \ldots, i-N+1$).

Also, 15 is the arithmetic unit, where the control input $u(i)$ is calculated according to the equation:

$$u(i) = \sum_{m=1}^{M} q_m r(i+m) - \sum_{n=1}^{N-1} g_n u(i-n) \qquad (2\text{-}1)$$

The numeral 16 indicates a sampler which commences sampling upon a sampling period T, and the numeral 17 indicates a hold circuit. The numeral 18 indicates the control object, with an input $u(t)$ and an amount subjected to control at the output $x(t)$.

Herein, deductions will be made from equation (2-1). It can be shown that the output $x(i)$ for the control object 18 is:

$$x(i) = h_1 u(i-1) + h_2 u(i-2) + \ldots + h_N u(i-N) \qquad (2\text{-}2)$$

Where $h_j$ ($j=1, 2, \ldots, N$), provided that the unit step response sample $H_j$ is increasing, as is shown in FIG. 2, it can be shown that $h_j = H_j - H_{j-1}$. Also, N should be chosen so that the response settles sufficiently.

Herein, if the control input $u(j)$ ($j=i+1, i+2, \ldots$) at time $i+1$ is assumed to be the same as $u(i)$, an output estimate $x^*(i+m)$ for time $i+m$ can be considered from the following equation;

$$x^*(i+m) = h_1 u(i+m-1) + h_2 u(i+m-2) + \ldots + h_N u(i+m-N) = \qquad (2\text{-}3)$$

$$H_m u(i) + \sum_{n=1}^{N-m} (H_{n+m} - H_{n+m-1}) u(i-n)$$

Accordingly, the future deviation estimate $e^*(i+m)$ becomes:

$$\begin{aligned} e^*(i+m) &= r(i+m) - x^*(i+m) = & (2\text{-}4) \\ & r(i+m) - H_m u(i) - \sum_{n=1}^{N-m} (H_{n+m} - H_{n+m-1}) u(i-n) \end{aligned}$$

Now, the weighted square sum $J$ of the future deviation estimates $e^*(i+m)$ $$J = \sum_{m=1}^{M} W_m \{e^*(i+m)\}^2 \qquad (2\text{-}5)$$

is taken as the evaluation function, and the control input $u(i)$ is chosen so that $J$ is at a minimum. Herein, $W_m$ is the weighting coefficient for the future deviation estimate $e^*(i+m)$ and this example is shown in FIG. 3 and FIG. 4.

The control input $u(i)$ for making the evaluation function $J$ a minimum can be derived from equation (2-1) as being;

$$\partial J/\partial u(i) = 0 \qquad (2\text{-}6)$$

provided that;

$$q_m = W_m H_m / \sum_{j=1}^{M} W_j H_j^2$$

$$g_n = \sum_{m=1}^{M} q_m(H_{n+m} - H_{n+m-1})$$

Also, as is shown in FIG. 2, $q_m$, Q and $g_n$ measure the control object step response, and by assigning a suitable weighting function $W_m$, this can be measured beforehand.

Figure 9:
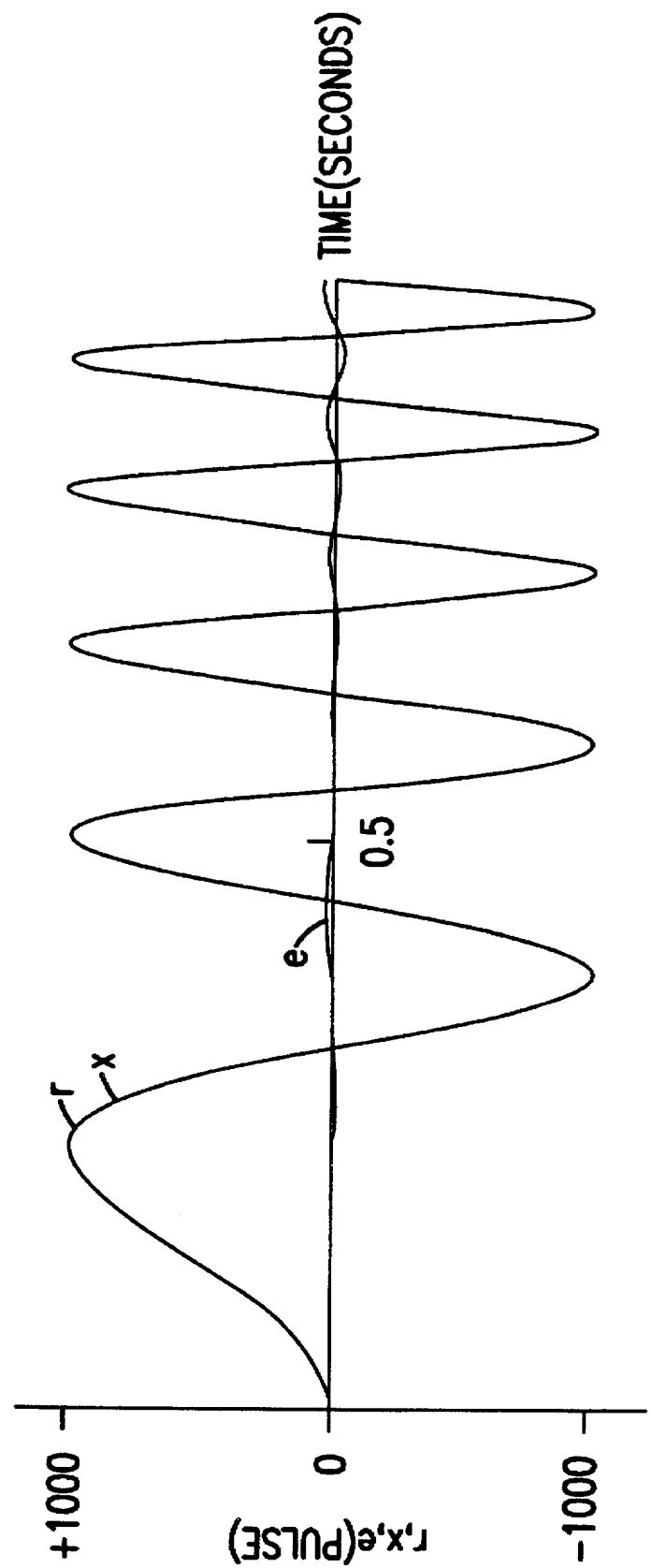
FIG. 9 is a graph describing the operation of this embodiment.

FIG. 9 is a view of the experimental results for the case where the present invention is used in the position control system for a D.C. servo motor. Here, the character r indicates the target position instruction for the motor, x indicates the response and e indicates the deviation.

In the method described above, according to this embodiment, using the future target instruction, the control object output and previously set constants, according to simple four rule arithmetic, an estimation control system with a suitable response for the target instruction can be realized. Moreover, the control input can be calculated beforehand so that the control object output is not used for the control input request.

Next, an explanation will be given of an embodiment to attain a third object of the present invention.

Figure 10:
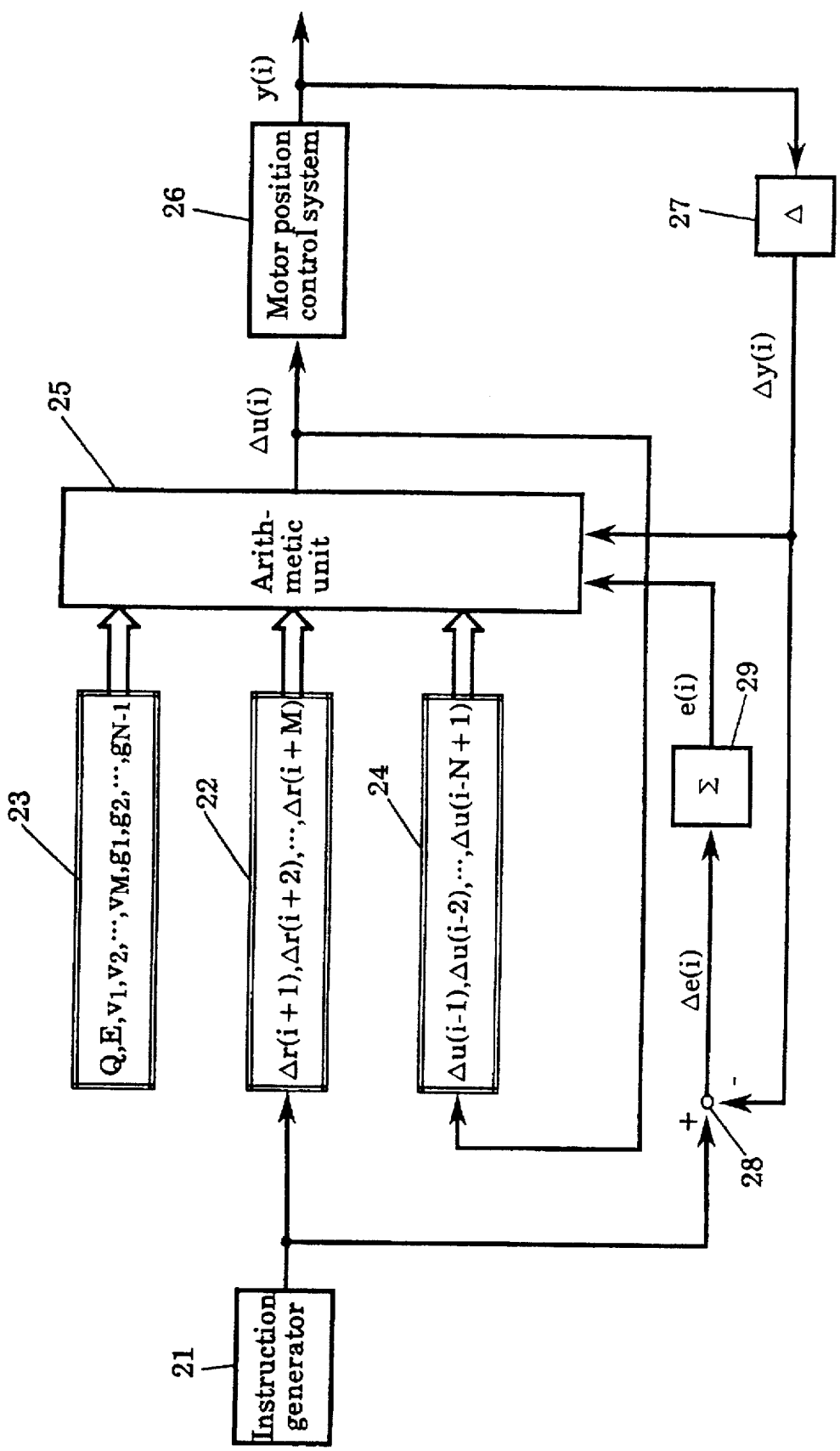
FIG. 10 is a block diagram of the structure of a third embodiment of the present invention.

FIG. 10 is a block diagram of the structure of this embodiment and in the same diagram, the numeral 21 indicates the instruction generator, numeral 22 indicates the memory for the future target instruction increment $\Delta r(j)$ (j=i+1, i+2, ..., i+M), numeral 23 indicates the memory for the constants Q, E, $v_1, v_2, ... v_M, g_1, g_2, ..., g_{N-1}$ and numeral 24 indicates the memory for the past control input increment $\Delta u(j)$ (j=i-1, i-2, ..., i-N+1). Also, the numeral 25 indicates the arithmetic unit, where the control input increment $\Delta u(i)$ is calculated according to the equation:

$$\Delta u(i) = \sum_{m=1}^{M} V_m \Delta r(i+m) - Q\Delta y(i) - \sum_{n=1}^{N-1} g_n \Delta u(i-n) + Ee(i) \quad (3-1)$$

The numeral 26 indicates the motor and this position control apparatus, which takes a target instruction increment, inputs the control increment $\Delta u(i)$, and outputs the actual position of the motor y(i). The numeral 27 indicates the differentiator which obtains the motor position increment $\Delta y(i)$, numeral 28 indicates the subtracter which obtains the deviation increment $\Delta e(i)$ and numeral 29 indicates the integrator which obtains the deviation e(i) from $\Delta e(i)$.

Herein, deduction are made from equation (3-1).

The future deviation estimate is estimated from the the next equation.

$$e^*(i+m) = r(i+m) - y^*(i+m) \quad (3-2)$$

$$= r(i+m) - P^m y(i) - \sum_{k=1}^{m} h_k u(i+m-k) -$$

$$\sum_{j=2}^{m+1} \sum_{k=j}^{N} P^{m-j+1}(h_k - Ph_{k-1})u(i-k+j-1)$$

Here, $h_k$(k=1, 2, ...) is the increment ($h_K = H_K - H_{K-1}$) for the samples $H_k$ (k=1, 2, ...) taken over control object unit step response sample intervals T. Also, P is the damping ratio after N samples and for example, if the integer coincides with the gain constant $K_s$, it is preferable to deduce that $P=1-\{(h_N/(K_S-H_{N-1})\}$. Here, N is the number of samples which the step response can be raised up to.

According to equation (3-2), the estimate of the future deviation increment $\Delta e^*(i+m)$ is:

$$\Delta e^*(i+m) = \Delta r(i+m) - \Delta y^*(i+m) \quad (3-3)$$

$$= \Delta r(i+m) - P^m \Delta y(i) - \sum_{k=1}^{m} h_k \Delta u(i+m-k) -$$

$$\sum_{j=2}^{m+1} \sum_{k=j}^{N} P^{m-j+1}(h_k - Ph_{k-1})\Delta u(i-k+j-1)$$

so that an estimate can be made.

Now, the future deviation increment estimate $\Delta e^*(i+m)$ and the weighted squared sum J for the deviation e(i):

$$J = \sum_{m=1}^{M} W_m \left\{ e(i) + \sum_{s=1}^{m} \Delta e^*(i+s) \right\}^2 \quad (3-4)$$

are taken as the evaluation function and the control input increment $\Delta u(i)$ is chosen so that J is at a minimum. Here, $W_m$ is the weighting for the future deviation, an example of which is shown in FIG. 3. It follows that $\Delta u(i)$ for making the evaluation function J minimum according to $\partial J/\partial \Delta u(i)=0$ can be derived from the aforementioned equation (3-1) if it is assumed that the future control input increment $\Delta u(i+1)$, $\Delta u(i+2), ..., \Delta u(i+M)=0$. Also, as is shown in FIG. 2, $v_m$, Q, $g_n$ and E measure the control object step response, and by assigning a suitable weighting function $W_m$, this can be measured beforehand from the following equation:

$$V_m = \sum_{s=m}^{M} q_s$$

$$q_m = W_m H_m / \sum_{j=1}^{M} W_j H_j^2$$

$$Q = \sum_{m=1}^{M} q_m \sum_{s=1}^{m} P^s$$

$$g_n = \begin{cases} \sum_{m=1}^{M} L_m b_{n+m} & (n \leq N-M) \\ \sum_{k=1}^{N-n} L_m b_{n+m} & (n > N-M) \end{cases}$$

$$L_m = \sum_{k=m}^{M} q_k T_{k-m+1}$$

$$T_k = 1 + PT_{k-1}$$
$$b_k = h_k - Ph_{k-1}$$
$$p = 1 - \{h_N/(K_s - H_{N-1})\}$$

$$E = \sum_{m=1}^{M} q_m$$

Figure 11:
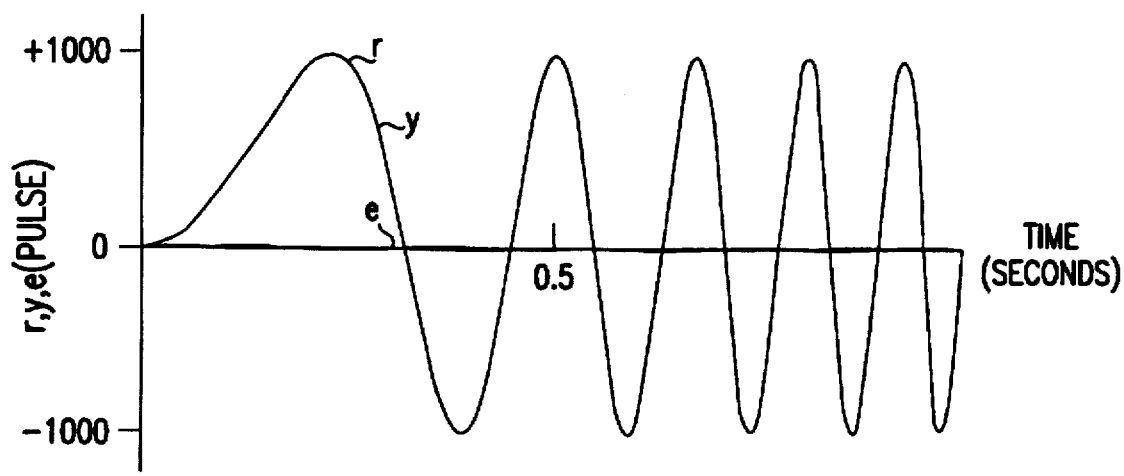
FIG. 11 is a graph describing the operation of this embodiment.
Figure 12:
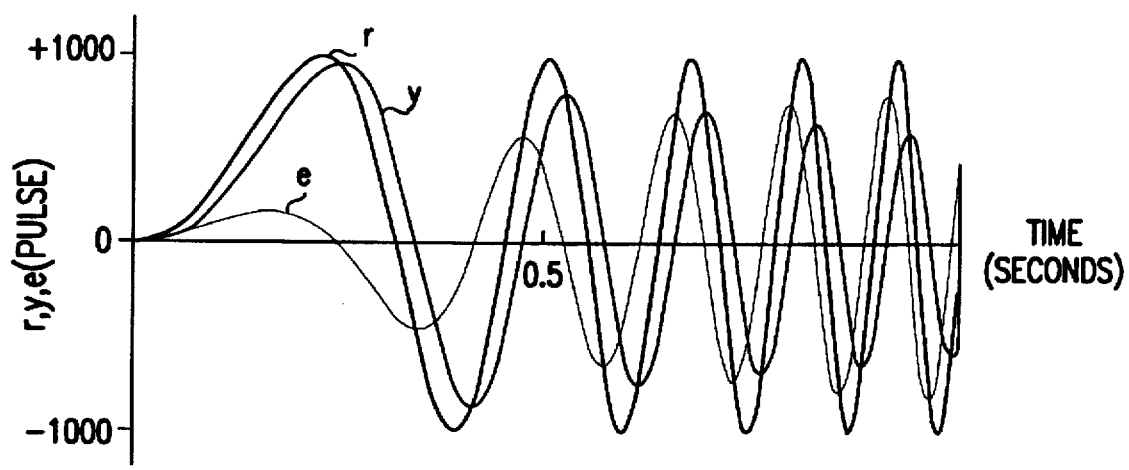
FIG. 12 is a further graph describing the operation of this embodiment.

FIG. 11 is a view of an example of this embodiment applied to the operation of a D.C. servo motor position control system and FIG. 12 is a view of an example of the operation of a conventional position control system. In FIG. 11 and FIG. 12, r is the target position instruction for the motor, y is the response and e is the deviation.

Also, for the case where the instruction is input as the control object rather than the instruction increment, the integral u(i) of the output $\Delta u(i)$ from the arithmetic unit 5 is obtained and it is preferable to then output the control object.

Here, an explanation has been given for the case of this embodiment being applied to a first embodiment apparatus. However, this embodiment can be applied to methods other than this where the future increment is estimated and the current control input increment is decided so that the evaluation function equation (3-4) becomes a minimum.

As mentioned above, according to the present embodiment, operation can be achieved by using less memory in less time.

Next, an explanation will be given of an embodiment to attain a fourth object of said present invention. Here, data is taken in, a predetermined calculation is carried out and the result is output, all in the space of one sampling cycle.

For example, [the output increment detection is two samples late] means that the output increment taken in this period is that from the time before the previous time.

Figure 13:
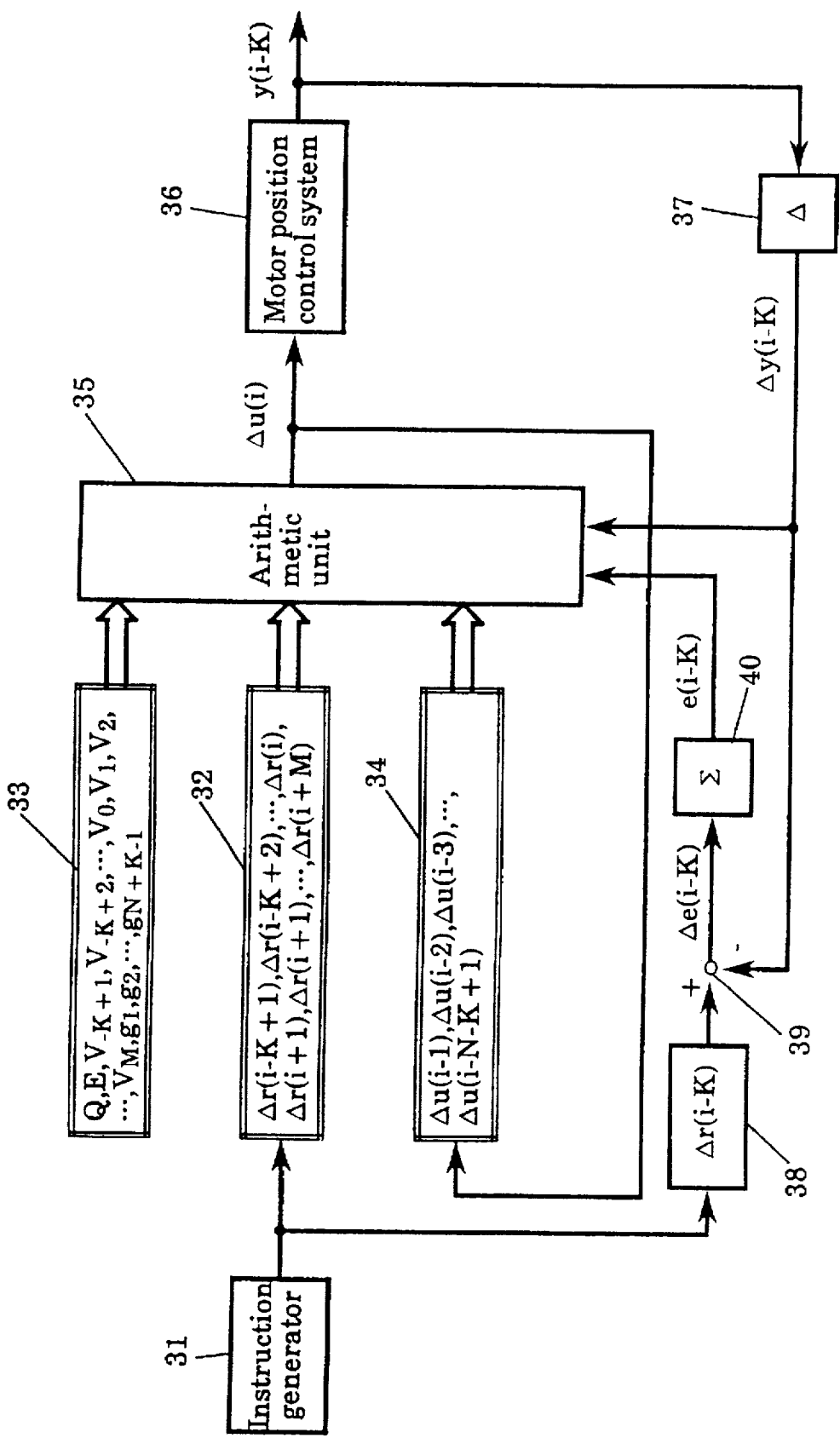
FIG. 13 is a block diagram of the structure of a fourth embodiment of the present invention.
Figure 35:
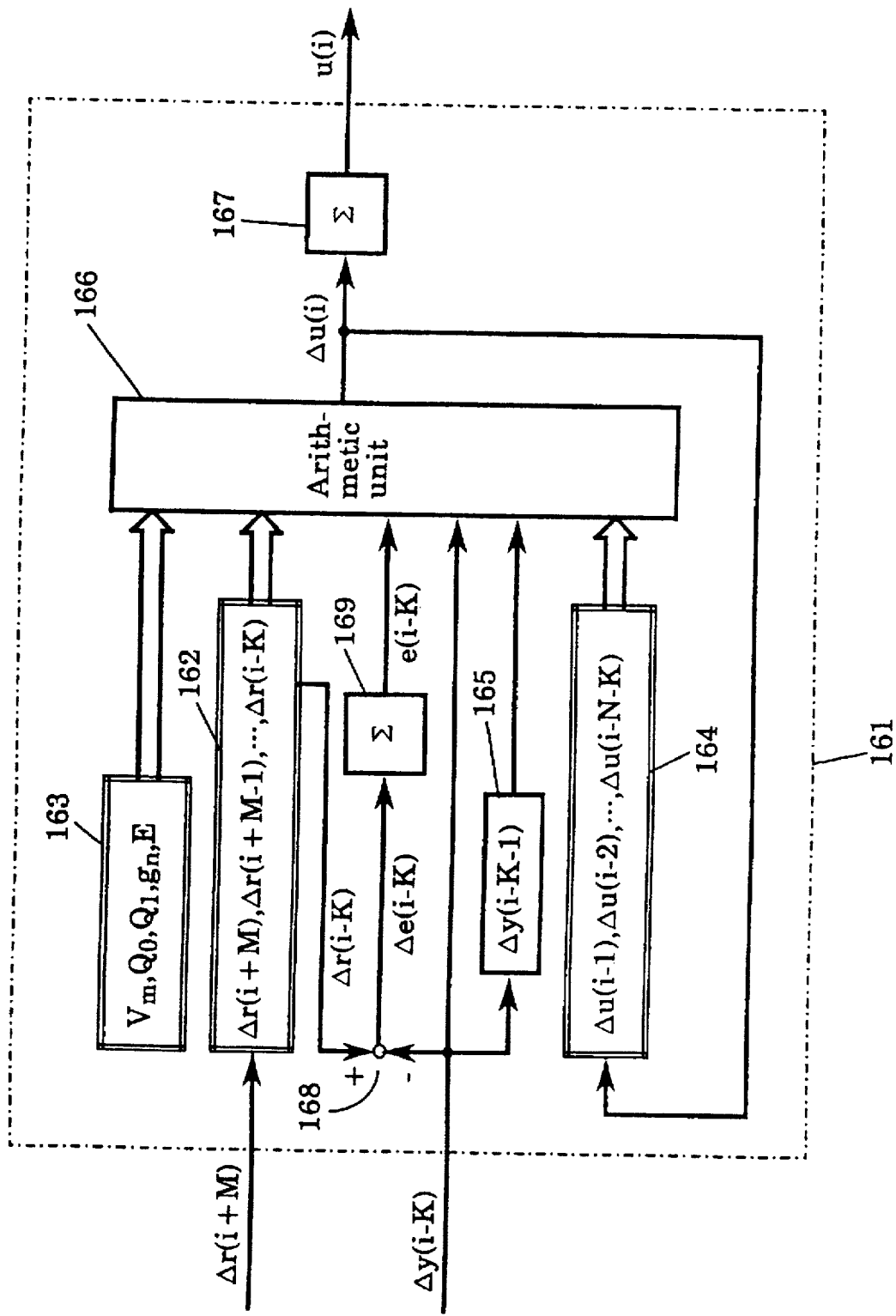
FIG. 35 is a block diagram of a fourteenth embodiment of this invention.

FIG. 13 is a block view of the structure of this embodiment. In the same diagram, the numeral 31 indicates the instruction generator, numeral 32 indicates the memory for the target instruction increment $\Delta r(j)$ (j=i-K+1, i-K+2, ..., i+M), numeral 33 indicates the memory for the constants Q, E, $V_{-K+1}$, $V_{-K+2}$, ..., $V_M$, $g_1$, $g_2$, ..., $g_{N+K-1}$ and the numeral 34 indicates the memory for the past control input increments $\Delta u(j)$ (j=i-1, i-2, ..., i-N-K+1). Also, FIG. 35 is the arithmetic unit where the control input increment is calculated according to the equation:

$$\Delta u(i) = \sum_{m=-k+1}^{M} V_m \Delta r(i+m) - Q\Delta y(i-K) - \sum_{n=1}^{N+K-1} g_n \Delta u(i-n) + E e(i-K) \quad (4\text{-}1)$$

The numeral 36 indicates the motor and its position control system, which takes a target instruction increment, inputs the control increment $\Delta u(i)$, and outputs the actual position of the motor $y(i-K)$ which is K sampling time late. The numeral 37 indicates the differentiator which obtains this increment $\Delta y(i-K)$ and numeral 38 indicates the memory for storing the target instruction increment occurring at time i-K. Numeral 39 indicates the subtracter which obtains the deviation increment $\Delta e(i-K)$ and numeral 40 indicates the integrator. Herein, deductions will be made from equation (4-1).

The future deviation increment estimate $\Delta e^*(i+m)$ can be estimated from:

$$\begin{aligned}\Delta e^*(i+m) &= \Delta r(i+m) - \Delta y^*(i+m) \quad (4\text{-}2)\\ &= \Delta r(i+m) - P^{m+K}\Delta y(i-K) - \sum_{j=1}^{m} h_j \Delta u(i+m-j) - \\ &\quad \sum_{n=1}^{N+K-1} (h_{m+m} - P^{m+K} h_{n-K})\Delta u(i-n)\end{aligned}$$

where $h_{N+j} = P^j h_N$ (j=1, 2, ...), and $h_j$ is the increment ($h_j = H_{j-1}$) for samples $H_j$ (j=1, 2, ...) taken over the kind of control object unit step response sample periods T shown in FIG. 2. Also, P is the damping ratio for the increment $h_n$ after N samples and for example, if the integer coincides with the normal fixed gain constant $K_S$ it is preferable to deduce that $P=1-\{h_N/(K_S-H_{N-1})\}$. Here, N is the number of samples which the step response can be raised up to. Now, the future deviation increment estimate $\Delta e^*(i+m)$ and the squared weighting J for the deviation $e(i-K)$ where $$J = \sum_{m=1}^{M} W_m \left\{ e(i-K) + \sum_{s=-K+1}^{m} \Delta e^*(i+s) \right\}^2 \quad (4\text{-}3)$$

are taken as the evaluation function and the control input increment, $\Delta u(i)$ is chosen so that J is at a minimum. Here, $W_m$ is the weighting for the future deviation, an example of which is shown in FIG. 3. It follows that $\Delta u(i)$ for making the evaluation function J minimum according to $\partial J/\partial u(i)$ can be derived from the aforementioned equation (4-1) if it is assumed that the future control input increment $\Delta u(i+1)$, $\Delta u(i+2)$, ..., $\Delta u(i+M)=0$. Also, $v_m$, Q, $g_n$ and E measure the control object step response shown in FIG. 2 and by assigning a suitable weighting function $W_m$, this can be calculated beforehand from the next equation:

$$q_m = W_m H_m / \sum_{j=1}^{M} W_j H_j^2$$

$$Q = \sum_{m=1}^{M} q_m \sum_{s=-K+1}^{m} P^{s+k}$$

$$V_m = \sum_{s=m}^{M} q_s \quad (q_s = 0 \, (s \leq 0))$$

$$g_n = \sum_{m=1}^{M} q_m \sum_{s=-K+1}^{m} (h_{n+s} - P^{s+K} h_{n-K})$$

$$(h_n = 0 \, (n \leq 0), \, h_{N+j} = P^j h_N \, (j = 1,2, \ldots N + m + 1))$$
$$P = 1 - \{h_N/(K_s - H_{N-1})\}$$

$$E = \sum_{m=1}^{M} q_m$$

As described above, according to the present embodiment, even in control systems where the detection of the output increment is K sampling time late, a preview control algorithm to give the most suitable target instruction for tracking can be acquired.

Next, an explanation will be given of an embodiment to attain a fourth object of said present invention. It is preferable if this embodiment is considered to be the same as the embodiment to attain the fourth embodiment of the invention but with the evaluation function in the equation (4-3) being made to be:

$$J = \sum_{m=1}^{M} W_m \left\{ e(i-K) + \sum_{s=-K+1}^{m} \Delta e^*(i+s) \right\}^2 + C\{\Delta u(i)\}^2 \quad (5\text{-}1)$$

it being preferable to make each constant as follows;

$$A = \sum_{j=1}^{M} W_j H_j^2$$

$$q_m = W_m H_m/(A + C)$$
$$P = 1 - \{h_N/(K_s - H_{N-1})\}$$

$$Q = \sum_{m=1}^{M} q_m \sum_{s=-K+1}^{m} P^{s+k}$$

$$V_m = \sum_{s=m}^{M} q_s \quad (q_s = 0 \, (s \leq 0))$$

$$g_n = \sum_{m=1}^{M} q_m \sum_{s=-K+1}^{m} (h_{n+s} - P^{s+K} h_{n-K})$$

$$(h_n = 0 \, (n \leq 0), \, h_{N+j} = P^j h_N \, (j = 1,2, \ldots N + m + 1))$$

$$E = \sum_{m=1}^{M} q_m$$

Figure 14:
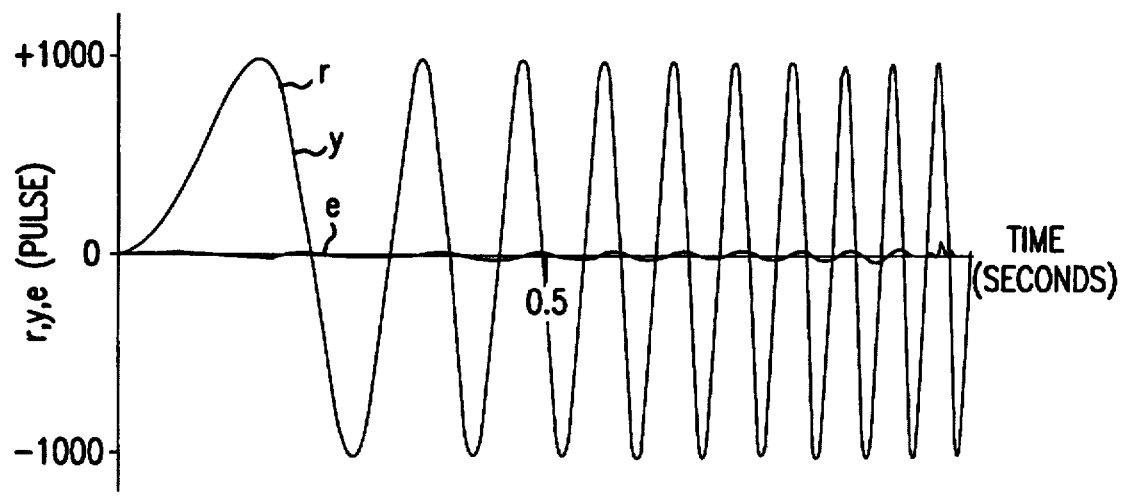
FIG. 14 is a graph describing the operation of a fifth embodiment of this invention.
Figure 15:
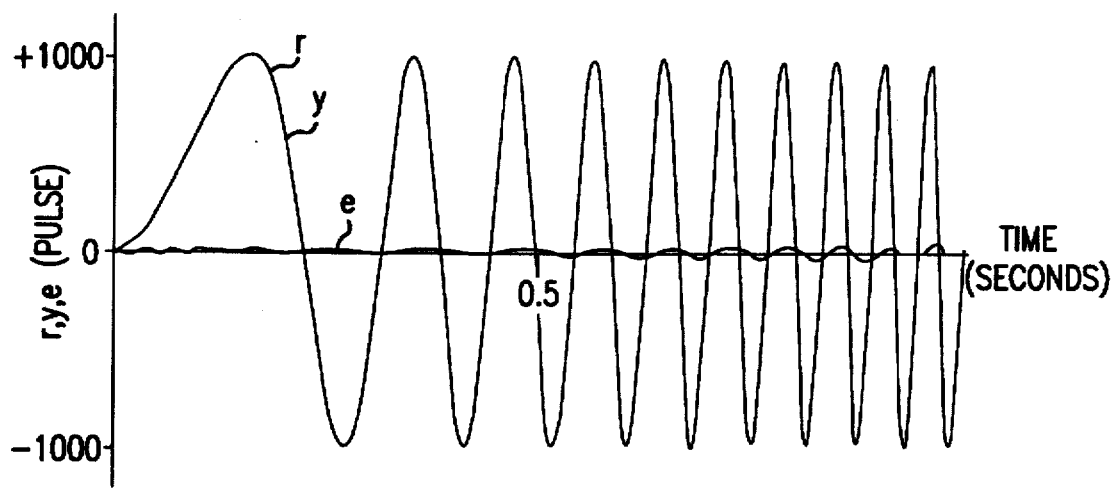
FIG. 15 is a graph describing the operation of this embodiment.

FIG. 14 is a view of an example of the operation for the case where this embodiment is applied to the position control system of a D.C. servo motor, and FIG. 15 is a comparative view of an example of the operation for the case where the apparatus for the aforementioned third embodiment are used. In FIG. 14 and FIG. 15, r is the target position instruction for the motor, y is the response and e is the deviation where the settings are N=10, M=5 and C=0.005.

As described above, according to the present embodiment, a preview control algorithm can be acquired where the target instruction is the most suitable for the tracking and where the response does not vibrate.

Next, an embodiment to attain a sixth object of the present invention will be described.

Figure 16:
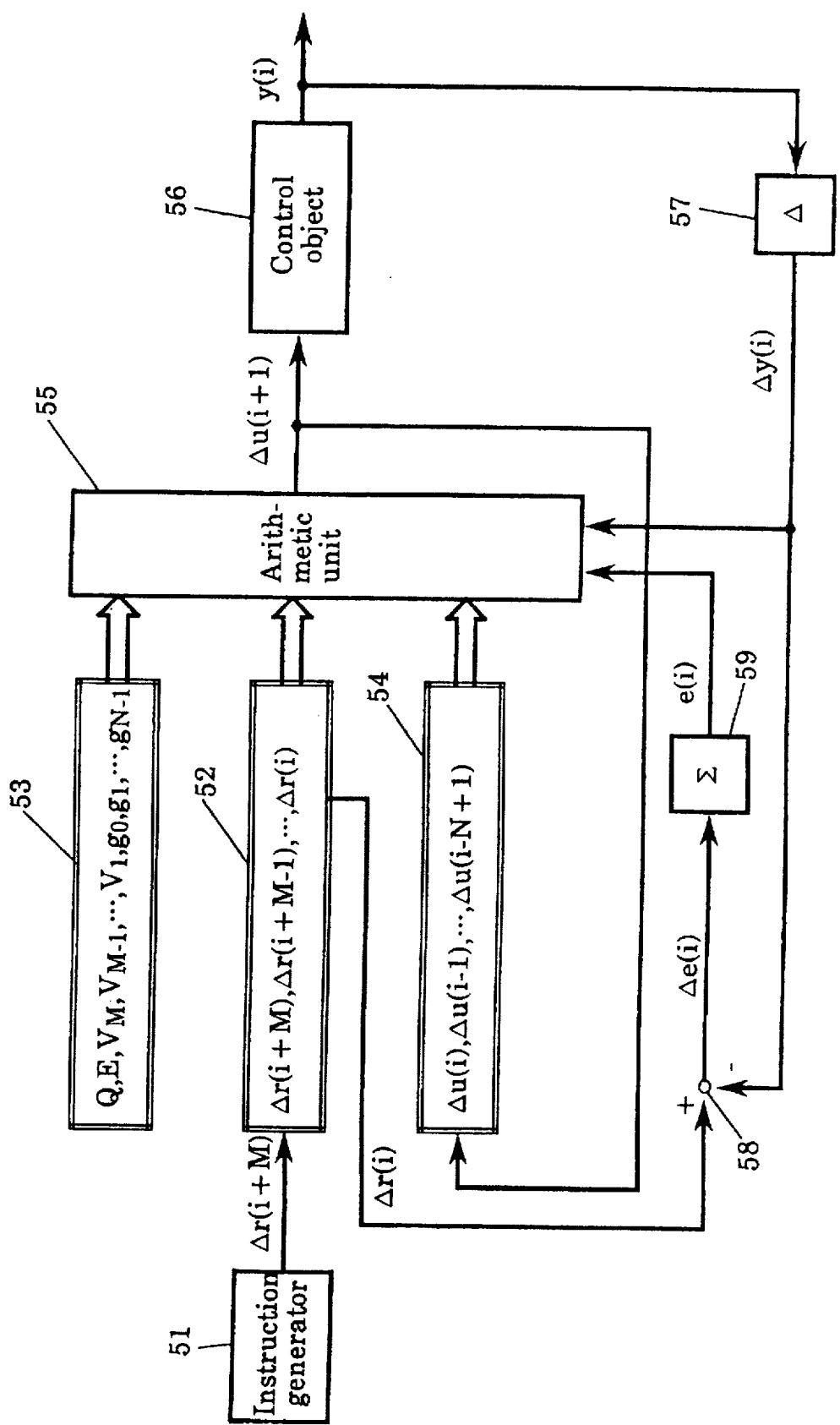
FIG. 16 is a block diagram of the structure of a sixth embodiment of the present invention.

This embodiment can be applied to the case where the detection of the output increment is K samples late but, here, the case where the detection of the output increment is not late will be described. FIG. 16 is a block diagram showing the structure of this embodiment. In the same diagram, the numeral 51 indicates the instruction generator, numeral 52 indicates the memory for the target instruction increment $\Delta r(i+M)$, $\Delta r(i+M-1)$, ..., $\Delta r(i)$, numeral 53 indicates the memory for the constants Q, E, $V_M$, $V_{M-1}$, ..., $V_1$, $g_0$, $g_1$, ..., $g_{N-1}$, and numeral 54 is the memory for the past control input increment $\Delta u(i)$ $\Delta u(i-1)$, ..., $\Delta u(i-N+1)$. Also, numeral 55 indicates the arithmetic unit where the control input increment $\Delta u(i+1)$ occurring at the present time i is calculated according to the equation:

$$\Delta u(i+1) = \sum_{m=1}^{M} V_m \Delta r(i+m) - Q \Delta y(i) - \sum_{n=0}^{N-1} g_n \Delta u(i-n) + Ee(i) \quad (6\text{-}1)$$

The numeral 56 indicates the control object, where the control input increment $\Delta u(i+1)$ taken to be the target instruction increment is input, and y(i) is output. Numeral 57 indicates the differentiator which obtains the increment $\Delta y(i)$, 58 is the subtracter which obtains the deviation increment $\Delta e(i)$ and 59 is the integrator. Herein, deductions are made from equation (6-1).

The future deviation increment estimate $\Delta e^*(i+m)$ can be estimated from:

$$\begin{aligned}\Delta e^*(i+m) &= \Delta r(i+m) - \Delta y^*(i+m) \quad (6\text{-}2)\\ &= \Delta r(i+m) - P^m \Delta y(i) - \sum_{j=1}^{m} h_j \Delta u(i+m-j) -\\ &\quad \sum_{n=1}^{N-1}(h_{n+m} - P^m h_n) \Delta u(i-n)\end{aligned}$$

where $h_j$ is the increment ($h_j = H_j - H_{j-1}$) for samples $H_j$ (j=1, 2, ... N) taken over the kind of control object unit step response sample periods T shown in FIG. 2, and it is assumed that this is reduced ($h_{N+j} = P^j h_N$(j=1, 2, ...)) by the damping ratio P after N samples. Here, for example, if the integer coincides with the normal fixed gain constant $K_S$ it is preferable to deduce that $P=1-\{h_N/(K_S-H_{N-1})\}$. Now, the control input increment $\Delta u(i+1)$ occurring at the current time i is chosen an evaluation function $$J = \sum_{m=1}^{M} W_m \left\{ e(i) + \sum_{s=1}^{m} \Delta e^*(i+s) \right\}^2 + C\{\Delta u(i+1)\}^2 \quad (6\text{-}3)$$

which is related to the estimate $\Delta e^*(i+m)$ of the future deviation increment, and where the deviation e(i) and the control input increment $\Delta u(i+1)$ are at a minimum. Here, $W_m$ is the weighting which occurs at the future time i+m, an example of which is shown in FIG. 3. Also, C is the control input increment weighting, and this weighting should be the correct amount. It follows that $\Delta u(i+1)$ for making the evaluation function J a minimum according to $\partial J/\partial \Delta u(i+1)$ =0 can be derived from the aforementioned equation (6-1) if it is assumed that the future control input increment $\Delta u(i+2)$, $\Delta u(i+3)$, ..., $\Delta u(i+M)=0$. Also, $v_m$, Q, $g_n$ and E measure the control object step response shown in FIG. 2 and by assigning a suitable weighting function $W_m$, this can be calculated beforehand from the next equation:

$$A = \sum_{j=1}^{M} W_j H_{j-1}^2$$

$q_m = W_m H_{m-1}/(A+C)$
$P = 1 - \{h_N/(K_s - H_{N-1})\}$ $$Q = \sum_{m=1}^{M} q_m \sum_{s=1}^{m} P^s$$

$$V_m = \sum_{s=m}^{M} q_s \quad (q_s = 0 (s \leq 0))$$

$$g_n = \sum_{m=1}^{M} q_m \sum_{s=1}^{m} (h_{n+s} - P^s h_n)$$

$(h_n = 0 (n \leq 0), h_{N+j} = P^j h_N (j = 1, 2, \ldots N+m+1))$ $$E = \sum_{m=1}^{M} q_m$$

Figure 17:
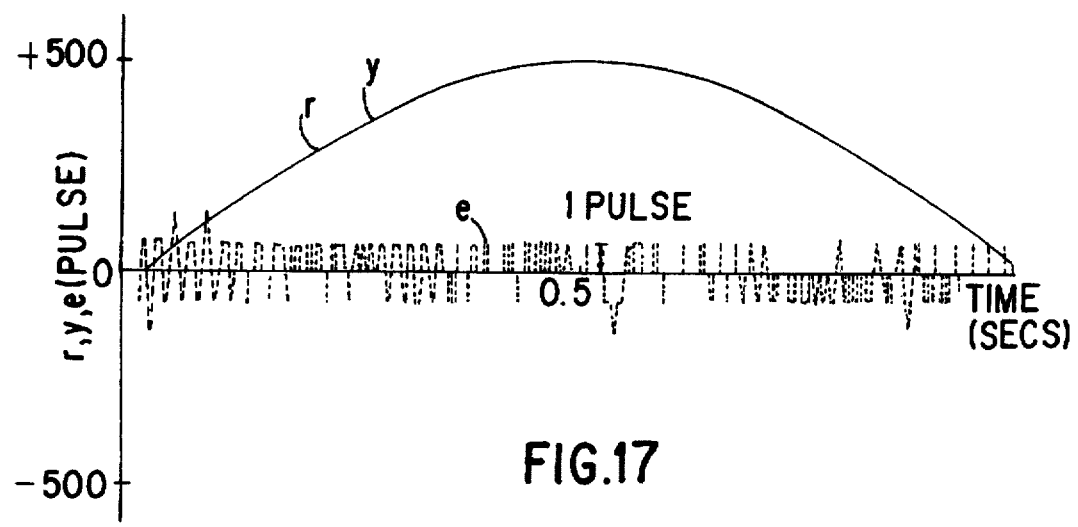
FIG. 17 is a graph describing the operation of this embodiment.
Figure 18:
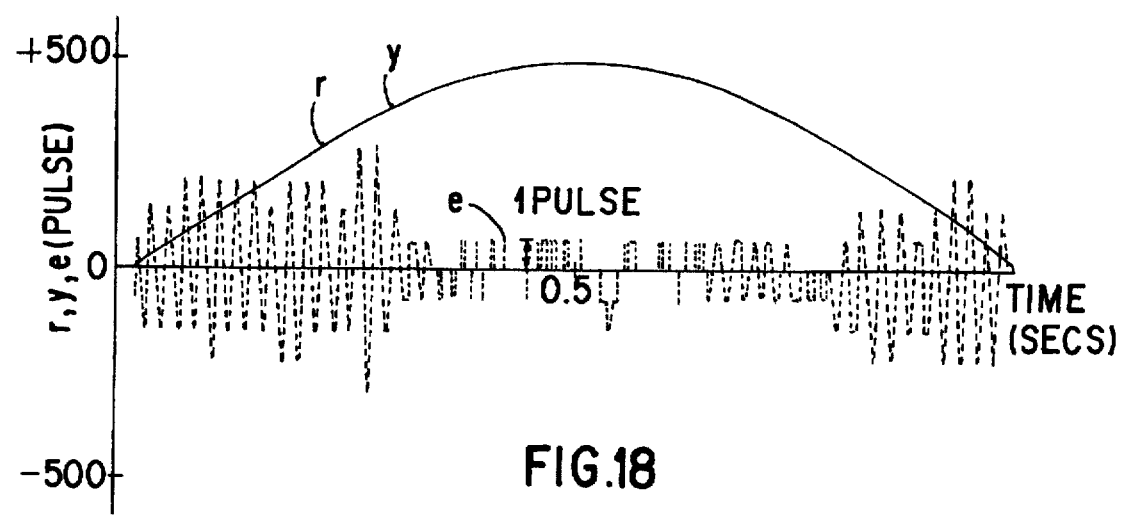
FIG. 18 is a further graph describing the operation of this embodiment.

FIG. 17 is an example of the operation for the case where this embodiment is applied to a single axis slider position control system where a D.C. servo motor acts as the control object, and FIG. 18 is an example of the operation of the apparatus for the fourth embodiment shown for comparison. In FIG. 17 and FIG. 18, r is the target position instruction, y is the response, e is the deviation and only the deviation is expanded. Here, the sampling period was 1 ms and the settings were N=5, M=10, $W_m=h_m$ and C=0.02.

As described above, according to this embodiment, a preview control algorithm can be acquired to give the target instruction most suited for the tracking even for the case where a time of i+1 for 1 sample following is used because the control increment decided at the current time i is late due to calculations and data transmissions.

Next, an embodiment to attain a seventh object of the present invention will be described.

Figure 19:
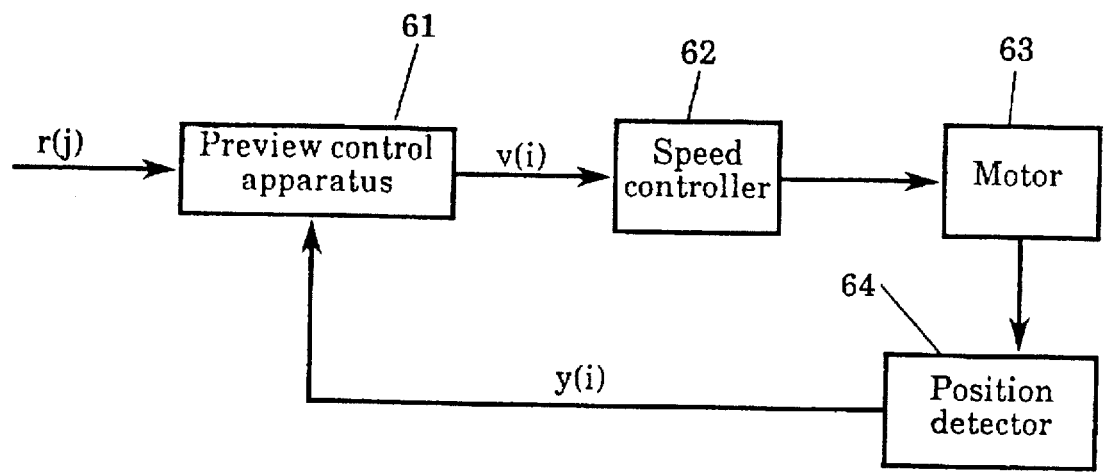
FIG. 19 is a block diagram for the case where a seventh embodiment of this invention is applied to a position control system.
Figure 20:
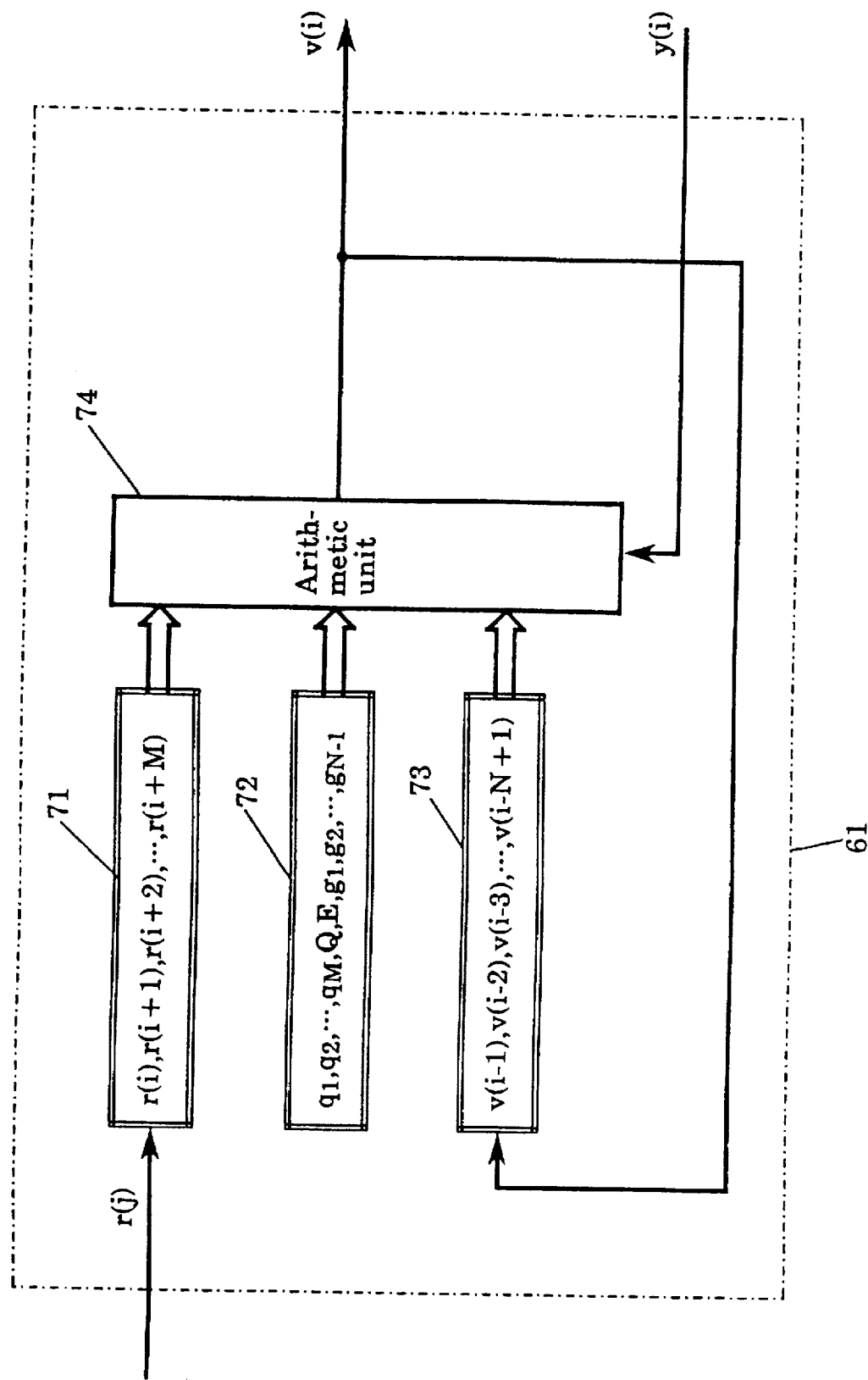
FIG. 20 is a further block diagram of this embodiment.

FIG. 19 is a block diagram for the case where this embodiment is applied to a position control system for a motor. In this diagram the numeral 61 indicates the preview control apparatus, where the future target instruction r(j) (j=i, i+1, i+2, ..., i+M) and the motor position y(i) are inputted, and the speed instruction v(i) is outputted to the speed controller 62. Numeral 63 indicates the motor and numeral 64 indicates the motor position detector. Next, a block diagram of the internal workings of the preview control apparatus is shown in FIG. 20. In this diagram, the numeral 71 indicates the memory for the future target instruction r(j), numeral 72 indicates the memory for the constants $q_1, q_2, \ldots, q_M$, Q, E, $g_1, g_2, \ldots, g_{N-1}$ and numeral 73 indicates the memory for the past speed instruction v(j) (j=i-1, i-2, ..., i-N+1). Also, numeral 74 indicates the arithmetic unit where the speed instruction v(i) is calculated according to the equation:

$$v(i) = \sum_{m=1}^{M} q_m r(i+m) - Qy(i) - \sum_{n=1}^{N-1} g_n v(i-n) + Ee(i) \quad (7\text{-}1)$$

Here, deductions are made from equation (7-1). It can be shown that the output y(i) from the motor 63 is $$y(i) = H_1 v(i-1) + H_2 v(i-2) + \ldots + H_N v(i-N) + \ldots \quad (7\text{-}2)$$

where $H_j$(j=1, 2, ..., N) is the output increment when the unit step instruction is input into the speed controller 62. Also, N should be chosen so that the response settles sufficiently. Similarly, the future output preview y*(i+m) can be given from the following equation.

$$y^*(i+m) = H_1 v(i+m-1) + H_2 v(i+m-2) + \quad (7\text{-}3)$$
$$H_3 v(i+m-3) + \ldots + H_N v(i+m-N) + \ldots$$

Here, if it is assumed hereinafter that after time i+1, v(j) (j=i+1, i+2, ...) is zero, the future deviation preview e*(i+m) becomes $$e^*(i+m) = r(i+m) - y^*(i+m) \quad (7\text{-}4)$$
$$= r(i+m) - y(i) - H_m v(i) - \sum_{n=1}^{N-1}(H_{n+m} - H_n)V(i-n)$$

Now, $$J = \sum_{m=1}^{M} W_m\{e^*(i+m) + Ae(i)\}^2 + C\{v(i)\}^2 \quad (7\text{-}5)$$

is taken to be the evaluation function and the speed instruction v(i) is chosen so that J becomes a minimum. Here, $W_m$ is the weighting for the future deviation preview e*(i+m), an example of which is shown in FIG. 3 and FIG. 4. Also, A and C are real numbers above zero.

As $$\partial J/\partial v(i)=0 \quad (7\text{-}1)$$

v(i) can be given from equation (7-1) to make J a minimum.

$$q_m = W_m H_m / \left(\sum_{j=1}^{M} W_j H_j^2 + C\right)$$

$$Q = \sum_{m=1}^{M} q_m$$

$$E = QA$$

$$g_n = \sum_{m=1}^{M} q_m(H_{n+m} - H_n)$$

Figure 21:
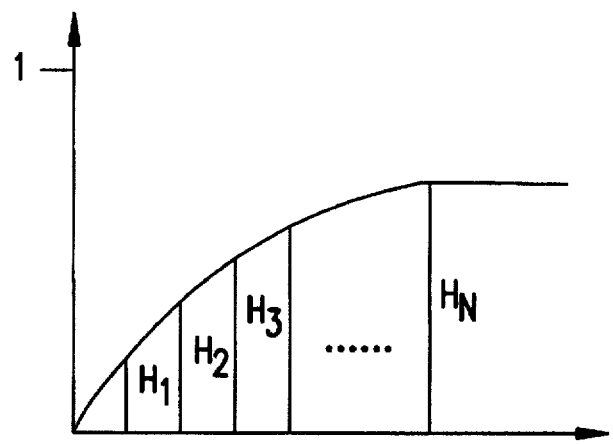
FIG. 21 is a graph of an example of the step response increment for the control object.

Also, $q_m$, Q, E, and $g_n$ measure the step response increment in FIG. 21, and by assigning the weighting $W_m$, A and C accordingly, calculations can be carried out beforehand.

Figure 22:
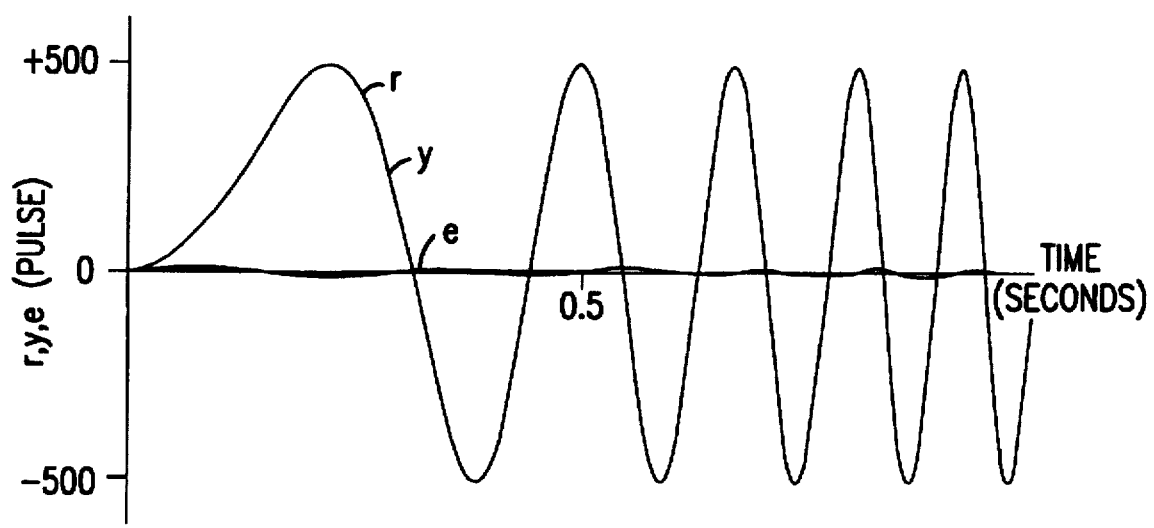
FIG. 22 is a graph describing the operation of this embodiment.

FIG. 22 is a view of an example of the operation for the case where this embodiment is used in a single axis slider position control system for a D.C. servo motor. In FIG. 22, r indicates the target instruction for the motor, y indicates the response and e indicates the deviation.

In the above description, according to this embodiment, by using a future target instruction, a past speed instruction, a control target output and constants which were determined beforehand, and by making a speed instruction using simple four rule arithmetic, a preview control apparatus can be realized which gives a high frequency instruction, which responds to external disorder and which is free from vibrations.

Next, an embodiment to attain an eighth object of the present invention will be described.

Figure 23:
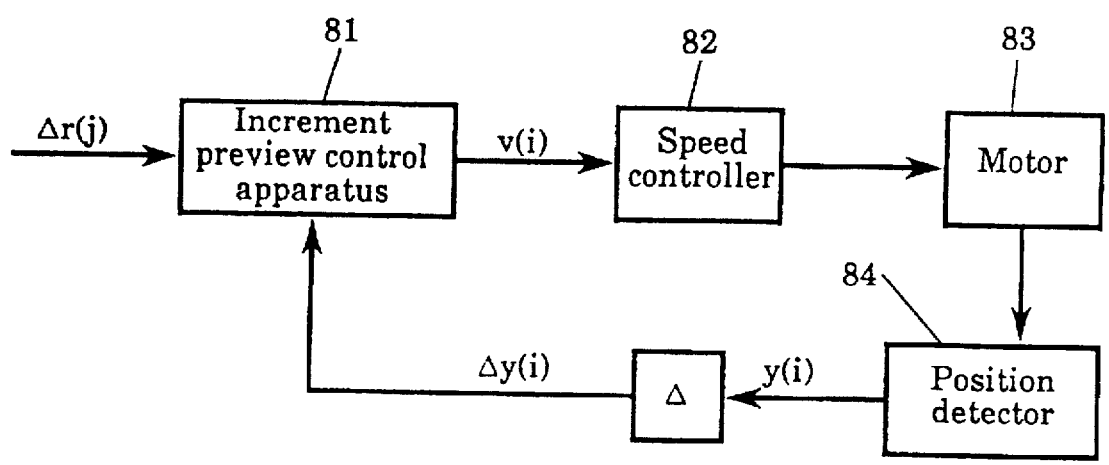
FIG. 23 is a block diagram for the case where an eighth embodiment of this invention is applied to a position control system.

FIG. 23 is a block diagram of the case where this embodiment is applied to a position control system for a motor. In this diagram, the numeral 81 indicates incremental preview control apparatus, where the future target instruction increment Δr(j) (j=i, i+1, i+2, ..., i+M) and the motor position increment Δy(i) are inputted, and the speed instruction v(i) is outputted to the speed controller 82. Numeral 83 indicates the motor, numeral 84 indicates the motor position detector and 85 is the differentiator.

Figure 24:
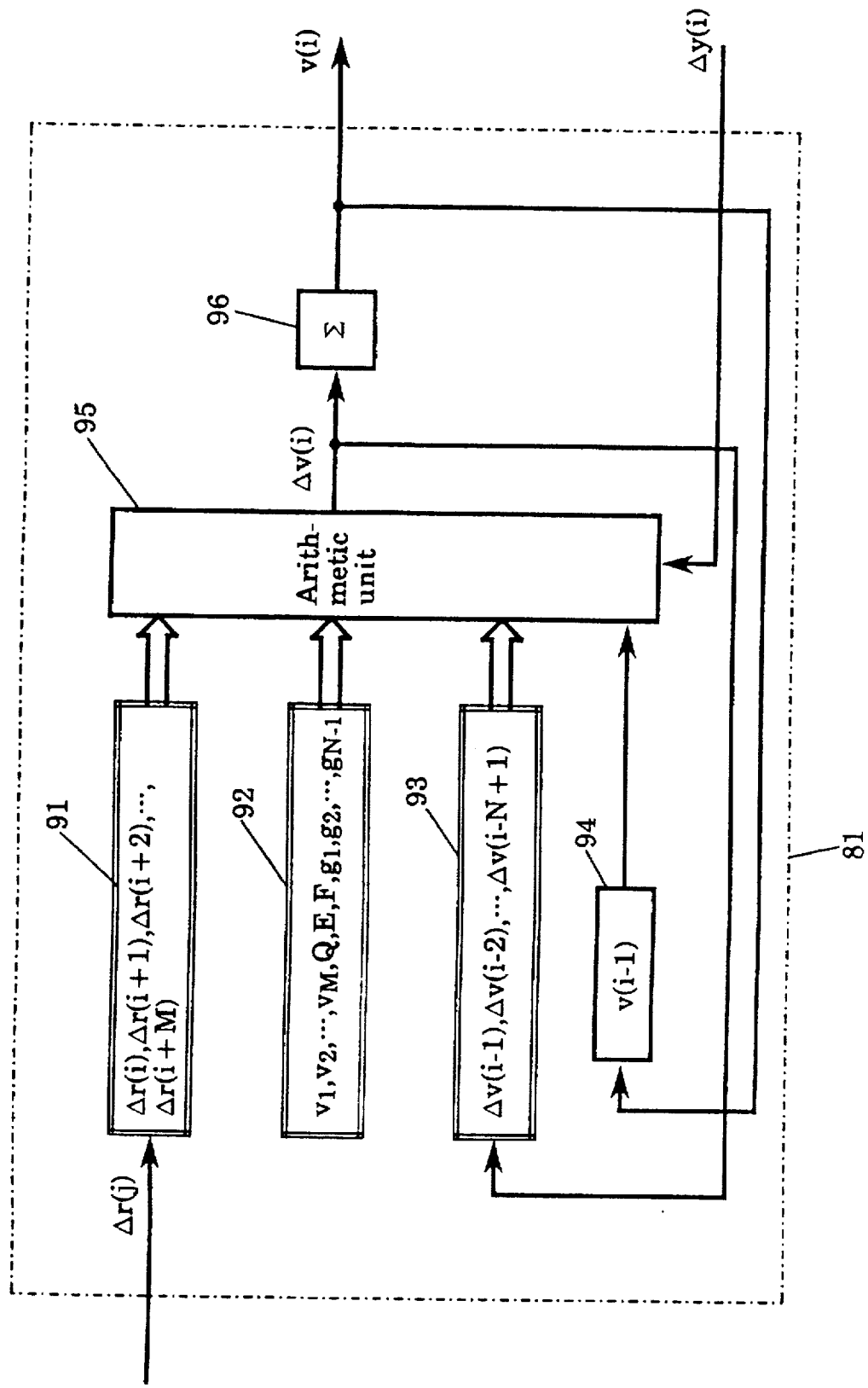
FIG. 24 is an internal block diagram of this embodiment.

Next, a block diagram of the internal workings of the incremental preview control apparatus 81 is shown in FIG. 24. In this diagram, the numeral 91 indicates the memory for the future target instruction increment Δr(j), numeral 92 indicates the memory for the constants $v_1, v_2, \ldots, v_m$, Q, E, F, $g_1, g_2, \ldots, g_{N-1}$. Numeral 93 indicates the memory for the past speed instruction increment Δv(j) (j=i-1, i-2, ..., i-N+1) and numeral 94 indicates the memory for the past sampling speed instruction v(i-1). Also, numeral 95 indicates the arithmetic unit where the speed instruction increment Δv(i) is calculated according to the equation $$\Delta v(i) = \sum_{m=1}^{M} v_m \Delta r(i+m) - Q\Delta y(i) - \sum_{n=1}^{N-1} g_n \Delta v(i-n) + Ee(i) - Fv(i-1) \quad (8\text{-}1)$$

Here, derivations are made from equation (8-1). The output increment Δy(i) for the motor 83 can be shown to be $$\Delta y(i)=H_1\Delta v(i-1)+H_2\Delta v(i-2)+\ldots+H_N\Delta v(i-N)+\ldots \quad (8\text{-}2)$$

where $H_j$ (j=1, 2, ..., N) is the output increment when the unit step instruction is input into the speed controller 82. Also, N should be chosen so that the response settles sufficiently. Similarly, the future output preview Δy*(i+m) can be given from the following equation.

$$\Delta y^*(i+m)=H_1\Delta v(i+m-1)+H_2\Delta v(i+m-2)+\ldots+H_N\Delta v(i+m-N)+\ldots \quad (8\text{-}3)$$

Here, if it is assumed hereinafter that after time i+1, Δv(j) (j=i+1, i+2, ...) is zero, the future deviation preview Δe*(i+m) becomes $$\Delta e^*(i+m) = \Delta r(i+m) - \Delta y^*(i+m) \quad (8\text{-}4)$$
$$= \Delta r(i+m) - \Delta y(i) - H_m\Delta v(i) - \sum_{n=1}^{N-1}(H_{n+m} - H_n)\Delta v(i-n)$$

Now, $$J = \sum_{m=1}^{M} W_m \left\{\sum_{s=1}^{m} \Delta e^*(i+s) + Ae(i)\right\}^2 + C\{v(i)\}^2 \quad (8\text{-}5)$$

is taken to be the evaluation function and the speed instruction v(i) is chosen so that J becomes a minimum. Here, $W_m$ is the weighting for the future deviation preview, an example of which is shown in FIG. 3 and FIG. 4. Also, A is at least one and C is a real number above zero.

As $$\partial J/\partial \Delta(i)=0 \quad (8\text{-}6)$$

v(i) can be given from equation (8-1) to make J a minimum, $$L_m = \sum_{s=1}^{M} H_s$$

$$B = \sum_{j=1}^{M} W_j L_j^2 + C$$

$$q_m = W_m L_m / B$$

$$V_m = \sum_{s=m}^{M} q_s$$

$$Q = \sum_{m=1}^{M} (q_m m)$$

$$E = Ax \sum_{m=1}^{M} q_m$$

$$g_n = \sum_{m=1}^{M} q_m \sum_{s=1}^{m} (H_{n+s} - H_n)$$

$$F = C/B$$

Also, $v_m$, Q, E, F and $g_n$ measure the step response increment in FIG. 21 and by assigning the weighting $W_m$, A and C accordingly, calculations can be carried out beforehand.

The numeral 96 indicates the arithmetic unit where a speed instruction increment is calculated and a speed instruction v(i) is made.

Figure 25:
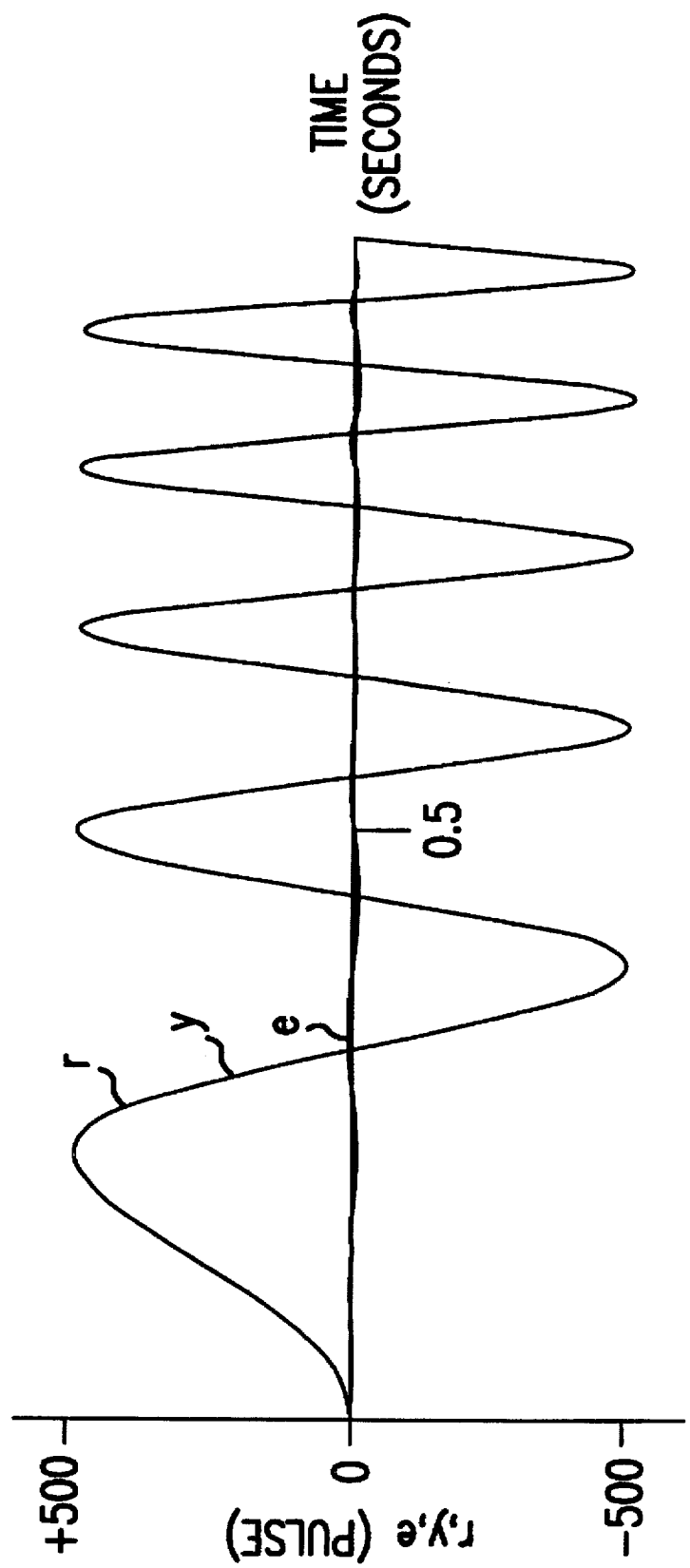
FIG. 25 is a description of the operation of this embodiment.

FIG. 25 is a view of an example of the operation for the case where this embodiment is used in a single axis slider position control system for a D.C. servo motor. In FIG. 25, r indicates the target instruction for the motor, y indicates the response and e indicates the deviation.

As described above, according to this embodiment, an incremental preview control apparatus is provided to give high frequency instructions which respond to external disorder without the occurrence of vibrations, and to provide the target instruction most suited to tracking while requiring less memory and calculation time.

Figure 26:
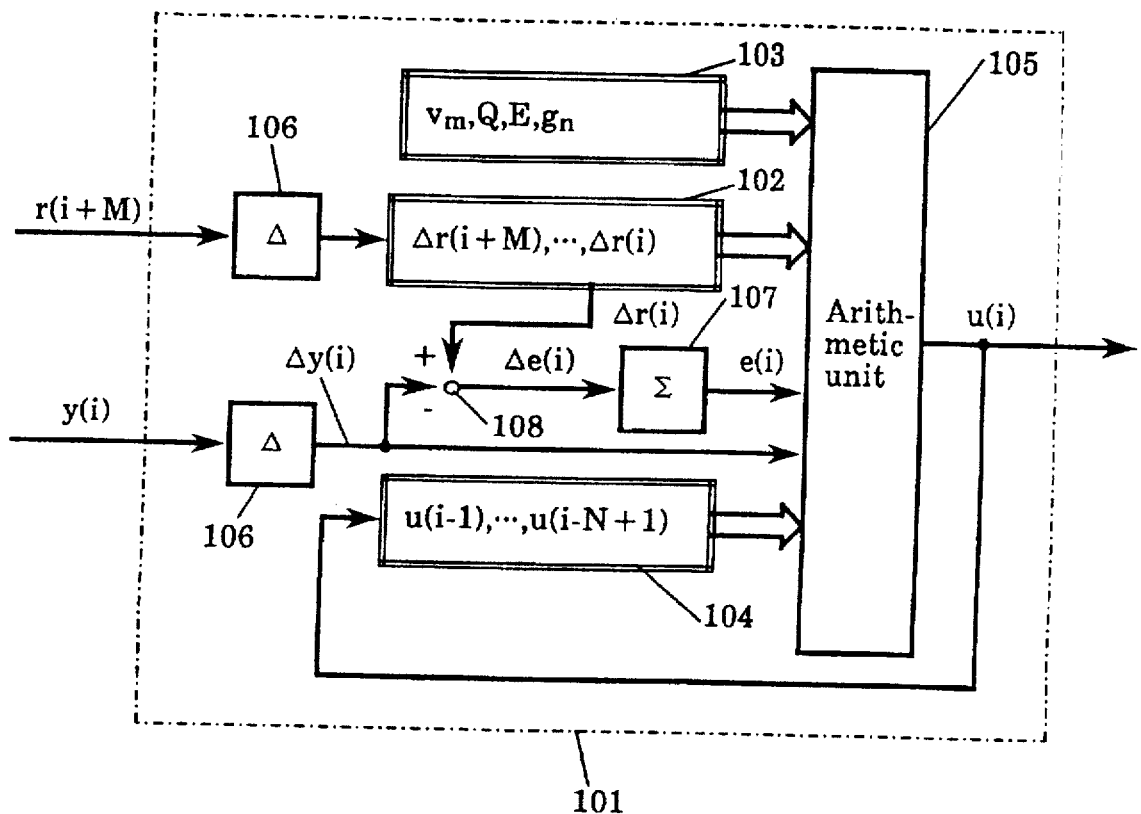
FIG. 26 is a block diagram of a ninth embodiment of this invention.

Next, an embodiment to attain a ninth object of the present invention will be described with reference to FIG. 26. In this diagram, the numeral 101 indicates the preview control apparatus for this embodiment, where the future target instruction r(i+M) and the control object output y(i) are inputted at the current time i, and the control input u(i) is outputted to the control object. The numeral 106 indicates a differentiator which obtains increments during sampling periods, numeral 102 indicates the memory for future target instruction increment Δr(i), Δr(i+1), . . . , Δr(i+M), numeral 108 indicates the subtracter which obtains the difference between the target instruction increment Δr(i) stored in the memory 102 and the output increment Δy(i) and numeral 107 indicates the integrator which obtains the deviation e(i) from Δe(i).

The numeral 103 indicates the memory for the constants Q, E, $v_1, v_2, \ldots, v_M, g_1, g_2, \ldots, g_{N-1}$ and numeral 104 indicates the memory for the past control input. The numeral 105 indicates the arithmetic unit where the control input u(i) is calculated according to the equation:

$$u(i) = \sum_{m=1}^{M} v_m \Delta r(i+m) - Q\Delta y(i) + Ee(i) - \sum_{n=1}^{N-1} g_n \Delta u(i-n) \quad (9\text{-}1)$$

The calculated output control u(i) is outputted from the preview control apparatus 101 so that it can be outputted to the control target and it is also stored in the memory 104.

Here, deductions are made from equation (9-1).

Figure 27:
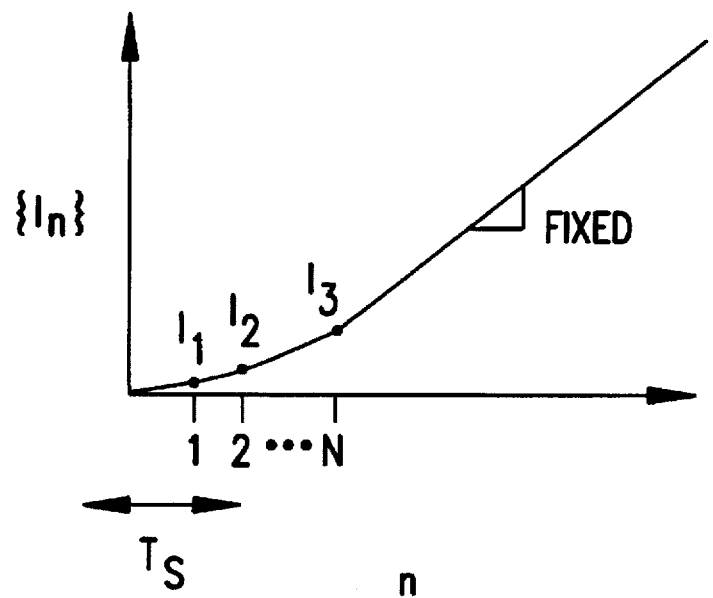
FIG. 27 is a graph of the characteristics of an incremental series for this embodiment.
Figure 28:
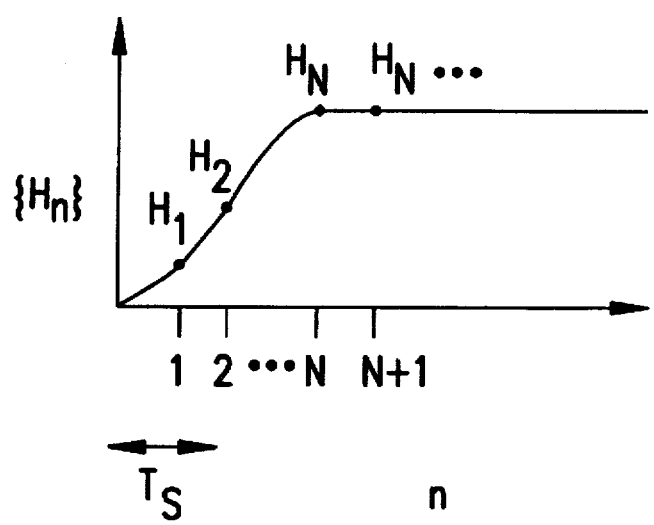
FIG. 28 is a further graph of the characteristics of an incremental series for this embodiment.

The increment series $\{I_1, I_2, \ldots\}$ during the sampling period $T_S$ for this unit step response sample increases linearly after N samples so that the control object has two constituent integral portions (FIG. 27). It follows that the increment series $\{H_n(H_n=I_n-I_{n-1})\}$ for the series $\{I_1, I_2, \ldots\}$ will become $\{H_1, \ldots, H_N, H_N, \ldots\}$ (FIG. 28).

Now, taking the following as the model during the control object input u(i) and the output y(i):

$$y(i)=I_1 u(i-1)+I_2 u(i-2)+\ldots \quad (9\text{-}2)$$

it can be shown that the increment Δy(i) for y(i) is:

$$\Delta y(i) = \sum_{n=1}^{\infty} H_n u(i-n) \quad (9\text{-}3)$$

and furthermore, Δy(i+m) can be shown to be:

$$\Delta y(i+m) = \sum_{n=1}^{\infty} H_n u(i+m-n) \quad (9\text{-}4)$$

Here, taking the future time control input u(i+m)=0, (m=1, 2, . . . , M), the preview Δy*(i+m) for the future output increment can be given by the following equation according to equations (9-3) and (9-4).

$$\Delta y^*(i+m) = \Delta y(i) + H_m u(i) - \sum_{n=1}^{N-1}(H_{n+m} - H_n)u(i-n) \quad (9\text{-}5)$$

It follows that the future deviation preview e*(i+m) is given by the next equation:

$$e^*(i+m) = e(i) + \sum_{s=1}^{m} \{\Delta r(i+s) - \Delta y^*(i+s)\} \quad (9\text{-}6)$$

The control input u(i) is set so that the evaluation function $$J = \sum_{m=1}^{M} W_m \{e^*(i+m) + \alpha e(i)\}^2 + C\{u(i)\}^2 \quad (9\text{-}7)$$

becomes a minimum, and if ∂J/∂u(i)=0, the aforementioned equation (9-1) can be obtained. Each constant $v_m$, Q, E and $g_n$ can be given from the next equations.

$$\left. \begin{array}{l} W = \sum_{j=1}^{M} W_j l_j^2 + C \\ q_s = W_s l_s/W \\ V_m = \sum_{s=m}^{M} q_s \\ Q = \sum_{s=1}^{M} (q_s s) \\ E = (1+\alpha) \sum_{s=1}^{M} q_s \\ q_{n=} = \sum_{m=1}^{M} v_m(H_{n+m} - H_n) \end{array} \right\} \quad (9\text{-}8)$$

An actual measured value or a value simulated from an item, such as the transmission function for the control object, can be used with the increment series for the control object unit step response sample.

Figure 29:
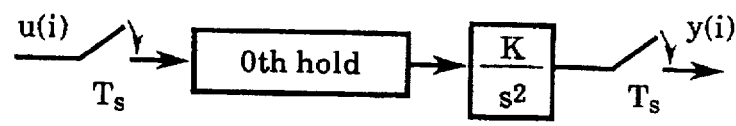
FIG. 29 is a block diagram of the structure of the control object.

Particularly, in the case of the system shown in FIG. 29 where the control object is made up of a sampler which samples for a sampling period $T_S$, a 0th hold, has a gain K and has two integrators:

$$I_1 = KT_S^2/2$$

$$I_n = KT_S^2/2 + (n-1)KT_S^2 \quad (n \geq 2)$$

$$H_1 = KT_S^2/2$$

$$H_n = KT_S^2 \quad (n \geq 2)$$

so, each of the constants $v_m$, Q, E and $g_n$ are calculated according to the sampling period $T_s$ and the gain K. In particular, if g becomes:

$$g_1 = (KT_s^2/2) \sum_{m=1}^{M} v_m \quad (9\text{-}1)$$

$$g_n = 0 \ (n \geq 2)$$

then equation (9-1) will become:

$$u(i) = \sum_{m=1}^{M} v_m \Delta r(i+m) - Q\Delta y(i) + Ee(i) - g_1 u(i-1)$$

Further, when the control object which inputs the torque instruction and outputs the position is a motor and a controller, the gain K can be calculated according to the gain of the torque controller and the inertia of the motor and load.

In the way described above, according to this embodiment, a preview control apparatus to which a control object having two constituent integral portions can be applied may be realized.

Figure 30:
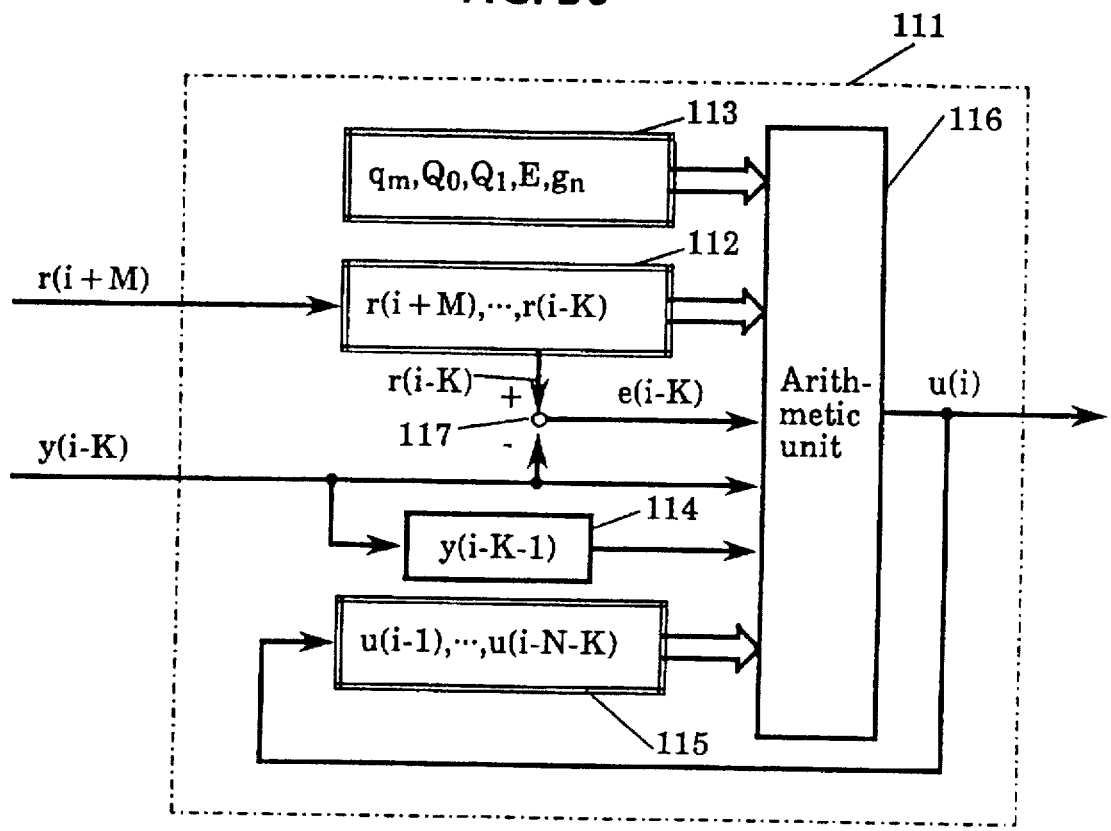
FIG. 30 is a block diagram of a tenth embodiment of this invention.

Next, an embodiment to attain the tenth object of this invention will be described with reference to FIG. 30. In this diagram, the numeral 111 indicates the preview control apparatus for this embodiment which inputs at the current time i a future target instruction r(i+M), and a control object output y(i-K) sampled K (where K is greater than or equal to zero) samples previously, and outputs a control input u(i) to the control object. Numeral 112 indicates the memory for storing the target instruction r(i–K), r(i–K+1), . . . , r(i+M), and numeral 117 indicates the subtracter which obtains the difference e(i–K) between the target instruction r(i–K) stored in the memory 112 and the output y(i–K).

The numeral 113 indicates the memory for storing the constants $Q_0, Q_1, E, q_1, \ldots, q_m, g_1, \ldots, g_{N+K}$, numeral 114 indicates the memory for storing the output y(i–K–1) and numeral 115 indicates the memory for storing the past control input.

The numeral 116 indicates the arithmetic unit where the control input u(i) is calculated according to the equation:

$$u(i) = \sum_{m=1}^{M} q_m r(i+m) - Q_0 y(i-K) + Q_1 y(i-K-1) + Ee(i-K) - \sum_{n=1}^{N+K} g_n u(i-n) \quad (10\text{-}1)$$

The calculated output control u(i) is outputted from the preview control apparatus 111 so that it can be outputted to the control target, and it is also stored in the memory 115.

Here, deductions are made from equation (10-1).

The first N samples $\{H_1, \ldots H_N\}$ for the unit step response of the control object are taken, and if the damping of this increment $h_n = H_n - H_{n-1}$ (n>N) is assumed hereinafter to have a constant ration P, a control object model can be acquired from the next equation.

$$\hat{y}(i) = P\hat{y}(i-1) + \sum_{n=1}^{N} b_n u(i-n) \quad (10\text{-}2)$$

where $b_n = h_n - Ph_{n-1}$.

The future output at a time i can then be estimated from the next equation.

$$y^*(i+m) = \hat{y}(i+m) + y(i-K) - \hat{y}(i-K) \quad (10\text{-}3)$$

According to equation (10-3), this becomes $$y^*(i+m) = P^{m+K}\hat{y}(i-K) - P\hat{y}(i-K-1) + y(i-K) + H_m u(i) + \sum_{n=1}^{N+K}(h_{m+m} - P^{m+K}h_{m-K} - b_{m-K})u(i-n) \quad (10\text{-}4)$$

where $h_{N+j} = P^j h_N$ (j>0).

Further, if y is used in place of $\hat{y}$, this becomes:

$$y^*(i+m) = (1 + P^{m+K})y(i-K) - Py(i-K-1) + H_m u(i) + \sum_{n=1}^{N+K}(h_{m+m} - P^{m+K}h_{m-K} - b_{m-K})u(i-n) \quad (10\text{-}5)$$

where $h_{N+j} = P^j h_N$ (j>0).

It follows that the future deviation estimate e*(i+m) is given by the following equation:

$$e^*(i+m) = r(i+m) - y^*(i+m) \quad (10\text{-}6)$$

and if the control input u(i) is selected so that the evaluation function $$J = \sum_{m=1}^{M} W_m \{e^*(i+m) + \alpha e(i-K)\}^2 + C\{u(i) - u(i-1)\}^2 \quad (10\text{-}7)$$

becomes a minimum, by putting $\partial J/\partial u(i)=0$ equation (10-1) can be obtained. Each of the constants $q_m, Q_0, Q_1, E$ and $g_n$ can then be given by the next equations.

$$\left. \begin{array}{l} W = \sum_{j=1}^{M} W_j H_j^2 + C \\ q_m = W_m H_m/W \\ Q = \sum_{m=1}^{M} q_m \\ Q_0 = Q + \sum_{m=1}^{M} q_m P^{m+K} \\ Q_1 = PQ \\ E = \alpha Q \\ g_1 = \sum_{m=1}^{M} q_m \{h_{1+m} - (1+P^{m+K})h_{1-K}\} - C/W \\ g_n = \sum_{m=1}^{M} q_m \{h_{n+m} - (1+P^{m+K})h_{n-K} + Ph_{n-K-1}\}^2 \quad n \geq 2 \end{array} \right\} \quad (10\text{-}8)$$

where $h_j=0$ (j<0) and $h_{N+j}=P^j h_N$ (j>1).

An actual measured value or a value simulated from an item, such as the transmission function for the control object, can be used with the series for the control object unit step response sample.

In the method described above, according to the present invention, a preview control apparatus with a highly accurate tracking operation can be obtained in which detrimental effects due to model errors are few.

Figure 31:
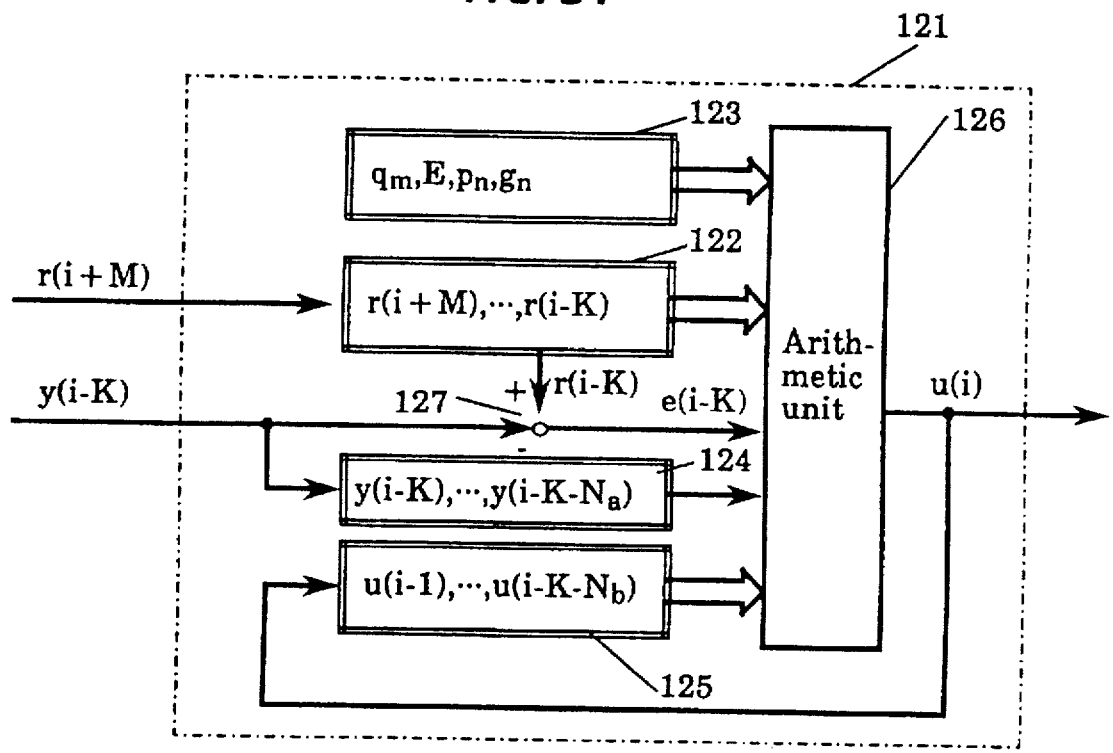
FIG. 31 is a block diagram of an eleventh embodiment of this invention.

Next, an embodiment to attain the eleventh object of this invention will be described with reference to FIG. 31. In this diagram, the numeral 121 indicates the preview control apparatus for this embodiment which inputs at the current time i a future target instruction r(i+M), and a control object output y(i–K) which was sampled K (K≧0) samples previously, and outputs a control input u(i) to the control object.

Numeral 122 indicates the memory for storing the target instruction r(i–K), r(i–K+1), . . . , r(i+M), and numeral 127 indicates the subtracter which obtains the difference e(i–K) between the target instruction r(i–K) stored in the memory 122 and the output y(i–K). The numeral 123 indicates the memory for storing the constants E, $q_1, \ldots, q_M, P_0, \ldots, P_{Na}, g_1, \ldots, g_{Nb+K}$ numeral 124 indicates the memory for storing the output y(i–K), . . . , y(i–K–Na) and numeral 125 indicates the memory for storing the past control input u(i), . . . , u(i–K–Nb).

The numeral 126 indicates the arithmetic unit where the control input u(i) is calculated according to the equation:

$$u(i) = \sum_{m=1}^{M} q_m r(i+m) - \sum_{n=0}^{Na} p_n y(i-K-n) + Ee(i-K) - \sum_{n=1}^{Nb+K} g_n u(i-n) \quad (11\text{-}1)$$

The calculated output control u(i) is outputted from the preview control apparatus 121 so that it can be outputted to the control target, and it is also stored in the memory 125.

Here, deductions are made from equation (11-1).

Now, assuming that the transfer function model for the control object is acquired from the dispersion time system for $$Gp(z) = \frac{b_1 z^{-1} + \ldots + b_{Nb} z^{-Nb}}{1 - a_1 z^{-1} - \ldots - a_{Na} z^{-Na}}$$

the model between the input and the output becomes that of the next equation.

$$\hat{y}(i) = \sum_{n=1}^{Na} a_n \hat{y}(i-n) + \sum_{n=1}^{Nb} b_n u(i-n) \tag{11-2}$$

At a time i, by using an actual measured value for the model output y(i+m)(where m is greater than or equal to −K+1) from that point on so that an actual measured value up until a time i−K for the output y(i−n) (where n is greater than or equal to K) can be acquired, it can be shown that $$\hat{y}(i-K+1) = \sum_{n=1}^{Na} a_n y(i-K+1-n) + \tag{11-3a}$$

$$\sum_{n=1}^{Nb} b_n u(i-K+1-n) \quad m=-K+1$$

$$\hat{y}(i+m) = \sum_{n=1}^{m+K-1} a_n \hat{y}(i+m-n) + \tag{11-3b}$$

$$\sum_{n=m+K}^{Na} a_n y(i+m-n) + \sum_{n=1}^{Nb} b_n u(i+m-n) \quad m > -K+1$$

and accordingly becomes the following equation:

$$\hat{y}(i+m) = \sum_{n=K}^{Na+K-1} \hat{a}_{mn} y(i-n) + \sum_{n=0}^{Nb+K-1} \hat{b}_{mn} u(i-n) \quad m \geq -K+1 \tag{11-4}$$

Here, if the future control input u(j)=0 (j>i), the coefficients $\hat{a}_{mn}$ and $\hat{b}_{mn}$ are given by:

$$\hat{a}_{(-K+1)n} = a_{(n-K+1)} \quad m=-K+1,\ K \leq n \leq N_a+K-1 \tag{11-5a}$$

$$\hat{a}_{mn} = \sum_{j=1}^{m+K-1} a_j \hat{a}_{(m-j)n} + a_{(n+m)} \quad m>-K+1,\ K \leq n \leq N_a+K-1 \tag{11-5b}$$

$$\hat{b}_{(-K+1)n} = b_{(n-K+1)} \quad m=-K+1,\ 0 \leq n \leq N_b+K-1 \tag{11-6a}$$

$$\hat{b}_{mn} = \sum_{j=1}^{m+K-1} a_j \hat{b}_{(m-j)n} + b_{(n+m)} \quad m>-K+1,\ 0 \leq n \leq N_b+K-1 \tag{11-6b}$$

where $a_n=0$ (n>$N_a$) and $b_n=0$ (n<1 and n>$N_b$).

Also, if u(j)=u(i) (j>i), $\hat{b}_{m0}$ in equation (11-6b) will become:

$$\hat{b}_{m0} = 0 \qquad -K+1 < m \leq 0$$
$$\hat{b}_{m0} = \sum_{j=1}^{m+K-1} a_j \hat{b}_{(m-j)0} + \sum_{j=1}^{m} b_j \quad m \geq 1 \tag{11-6b'}$$

Here, if the output after the time i−K is measured by $$y^*(i+m) = \hat{y}(i+m) + \tag{11-7}$$

$$\left\{ y(i-K) - \sum_{n=1}^{Na} a_n y(i-K-n) - \sum_{n=1}^{Nb} b_n u(i-K-n) \right\}$$

$$m \geq -K+1$$

the output estimate y*(i+m) can be shown to be:

$$y^*(i+m) = \sum_{n=K}^{Na+K} A_{mn} y(i-n) + \sum_{n=0}^{Nb+K} B_{mn} u(i-n) \quad m \geq -K+1 \tag{11-8}$$

and the coefficients $A_{mn}$ and $B_{mn}$ are given by the following equations.

$$A_{mK} = 1 + \hat{a}_{mK} \qquad n = K$$
$$A_{mn} = \hat{a}_{mn} - a_{(n-K)} \quad K+1 \leq n \leq N_a+K \tag{11-9}$$
$$B_{mn} = \hat{b}_{mn} - b_{(n-K)} \quad 0 \leq n \leq N_b+K$$

where $b_n=0$ (n<1), $\hat{a}_{m(Na+K)} = \hat{b}_{m(Nb+K)} = 0$.

Also, $\hat{y}$ on the right hand side of the equation (11-3b) is substituted for y* in equation (11-7)

$$\hat{y}(i+m) = \sum_{n=1}^{m+K-1} a_n y^*(i+m-n) + \tag{11-3b'}$$

$$\sum_{n=m+K}^{Na} a_n y(i+m-n) + \sum_{n=1}^{Nb} b_n u(i+m-n) \quad m > -K+1$$

and substitute $\hat{y}(i+m)$ from (11-3a) and (11-3b') into (11-7), so that y*(i+m) can then be obtained recursively.

In this case, if u(j)=0 (j>i), then the coefficients $A_{mn}$ and $B_{mn}$ in equation (11-8) can be given by $$A_{(-K+1)n} = 1 + a_1 \quad m=-K+1,\ n=K$$

$$A_{(-K+1)n} = a_{(n-K+1)} - a_{(n-K)} \quad m=-K+1, K < n \leq N_a+K \tag{11-10a}$$

$$A_{mK} = 1 + \sum_{j=1}^{m+K-1} a_j A_{(m-j)K} + a_{(K+m)} \quad m>-K+1,\ n=K$$

$$A_{mn} = \sum_{j=1}^{m+K-1} a_j A_{(m-j)n} + a_{(n+m)} - a_{(n-K)} \quad m>-K+1, \tag{11-10b}$$
$$K < n \leq N_a+K$$

$$B_{mn} = b_{(n+m)} - b_{(n-K)} \quad m=-K+1,\ 0 \leq n \leq N_b+K \tag{11-11a}$$

$$B_{mn} = \sum_{j=1}^{m+K-1} a_j B_{(m-j)n} + b_{(n+m)} - b_{(n-K)} \tag{11-11b}$$

$$m > -K+1,\ 0 \leq n \leq N_b+K$$

where $a_n=0$ (n>$N_a$), $b_n=0$ (n<1 or n>$N_b$)
and if u(j)=u(i) (j>i), $B_{m0}$ in equation (11-11b) can be expressed by the next equation.

$$B_{m0} = 0 \qquad -K+1 < m \leq 0$$
$$B_{m0} = \sum_{j=1}^{m+K-1} a_j B_{(m-j)0} + \sum_{j=1}^{m} b_j \quad m \geq 1 \tag{11-11b'}$$

According to the above, the output estimate y*(i+m) (m≥K+1) can be obtained from equation (11-8) and the $A_{mn}$ and $B_{mn}$ can be obtained from equations (11-5), (11-6), (11-9), (11-10) and (11-11).

It follows that the future deviation estimate e*(i+m) can be obtained from the equation $$e^*(i+m) = r(i+m) - y^*(i+m) \quad 1 \leq m \leq M$$

and by setting the control input u(i) to make the evaluation function $$J = \sum_{m=1}^{M} W_m \{e^*(i+m) + \alpha e(i-K)\}^2 + C\{u(i)\}^2 \tag{11-12}$$

a minimum equation (11-1) can be obtained by making $\partial J/\partial u(i)=0$. Each of the constants $q_m$, $p_n$, E, and $g_n$ can then be obtained from the following equations.

$$W = \sum_{j=1}^{M} W_j B_{j0}^2 + C$$
$$q_m = W_m B_{m0}/W \qquad m=1,2,\ldots,M$$
$$E = \alpha \sum_{m=1}^{M} q_m \tag{11-13}$$
$$p_n = \sum_{m=1}^{M} q_m A_{m(n+K)} \quad n=0,1,\ldots,N_a$$
$$g_n = \sum_{m=1}^{M} q_m B_{mn} \quad n=1,2,\ldots,N_b+K$$

Also, for the case where $$J = \sum_{m=1}^{M} W_m \{e^*(i+m) + \alpha e(i-K)\}^2 + C\{u(i) - u(i-l)\}^2 \quad (11\text{-}12')$$

is taken as the evaluation function in place of the evaluation function in equation (11-12), $g_1$ in equation (11-13) becomes as follows:

$$g_1 = \sum_{m=1}^{M} q_m B_{mn} - C/W \quad (11\text{-}13')$$

As described above, according to this embodiment, a preview control apparatus with a more accurate tracking operation can be realized, where a control object output corresponding to a delayed detection can be attained with few calculations.

Figure 32:
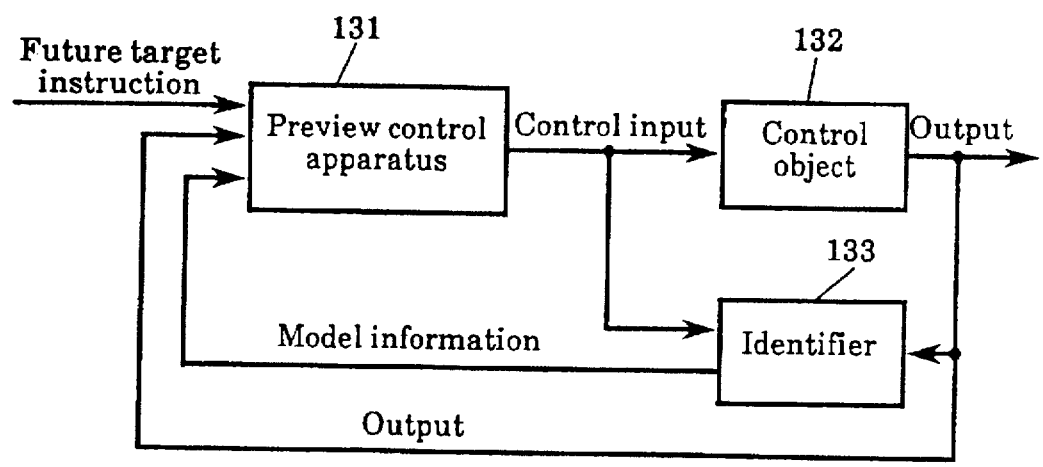
FIG. 32 is a block diagram of a twelfth embodiment of this invention.

Next, an embodiment to attain the twelfth object of this invention will be described with reference to FIG. 32.

In this diagram, the numeral 131 indicates the preview control apparatus for this invention which takes the future target instruction, the output from the control object 132 and the model information from the identifier 133 as its input, and outputs a control input to the control target 132.

As for the method for deciding the control input, for example, the method in the first embodiment could be used for the case where model information taken as the step response model is inputted, or the method in the eleventh embodiment could be used for the case where a transfer function model is inputted, or otherwise a step response could be calculated from of the inputted transfer function model and the method for the first embodiment could be used.

Usual methods, such as, transitional response methods, frequency response methods, statistical techniques, time series expression methods and standard form model reference adaptive identifiers can be used as the identification method for the identifier 133 (Ohm Co. [automatic control foundations handbook], P71–90, P702).

Figure 33:
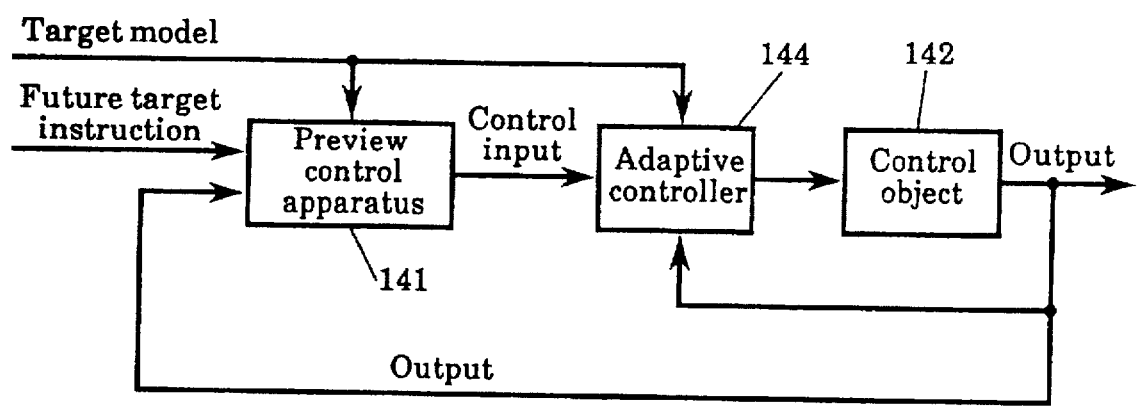
FIG. 33 is a block diagram of a further example of a twelfth embodiment of this invention.

FIG. 33 is a view of a further embodiment to attain the twelfth object. In this diagram, the numeral 141 indicates the preview control apparatus for this invention, which inputs a future target instruction, the output from the control object 142 along with the target model, and outputs a control input to the adaption controller 144. A method the same as the one used for the embodiment in FIG. 32 set according to the form of the target model is suitable as the method of setting the control input.

The numeral 144 indicates the adaption controller which takes the target model, the control input and the control object output as its input, and which controls the control target by having its characteristic from the control input to the output coincide with the target model characteristic. In this way the identifier 133 can then be realized by a method such as adjusting the gain by making a comparison between the identifier model obtained by the same technique and the target model, by a model reference adaptive control method or by a torque observer.

The identifier 133 and the adaption controller 144 could also obtain signals other than control input and output signals from the preview control apparatus 131 and 141 or the control objects 132 and 142. Also, the identifier 133 and the adaption controller 144 could be constructed internally within the preview controllers 131 and 141 or the control targets 132 and 142 respectively.

In the method described above, according to the present invention, a preview control apparatus with a more accurate tracking operation which responds to fluctuations in the characteristics of the control object can be realized.

Figure 34:
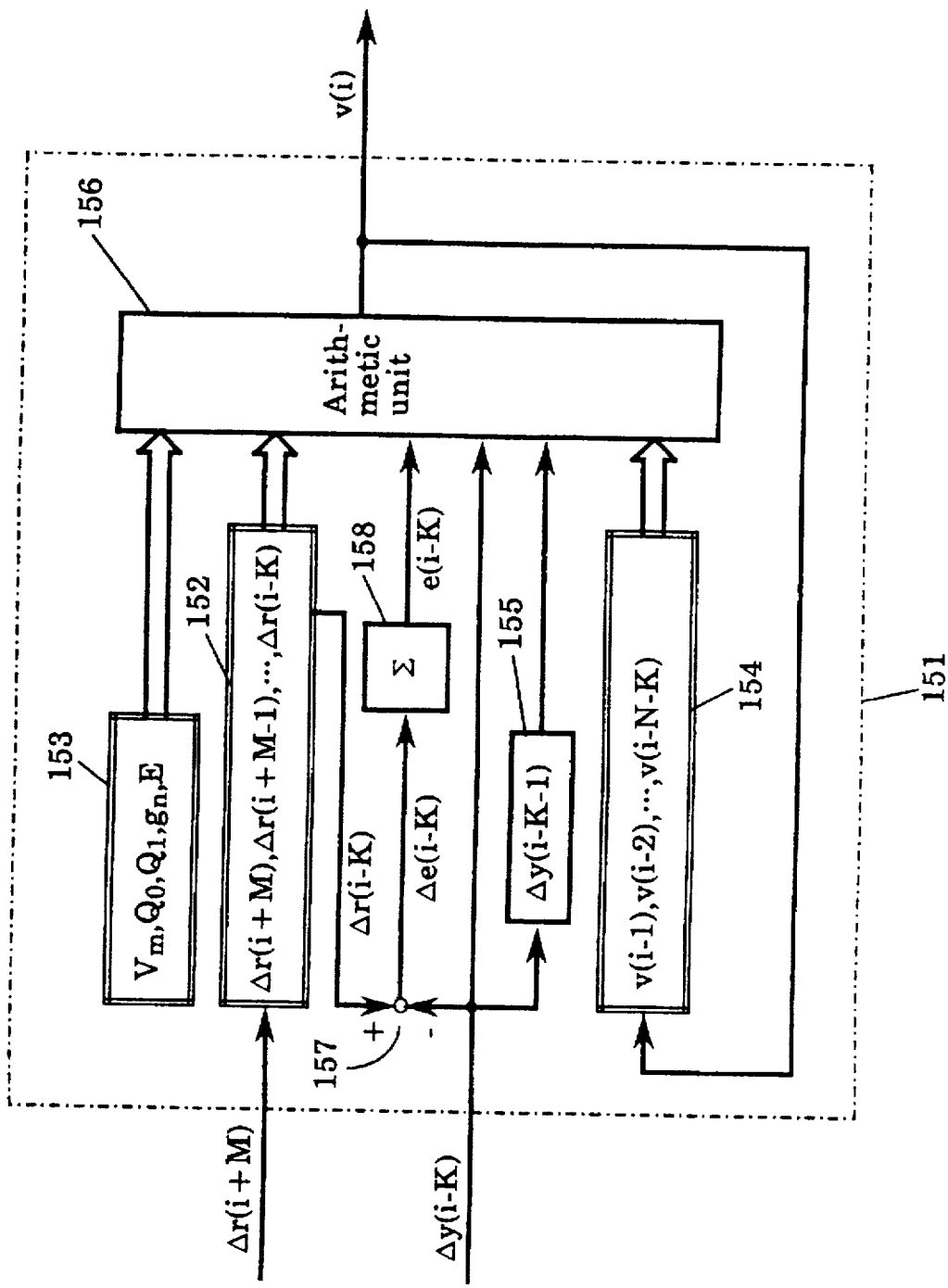
FIG. 34 is a block diagram of a thirteenth embodiment of this invention.

Next, an embodiment to attain the thirteenth object of this invention will be described with reference to FIG. 34. In this diagram, the numeral 151 indicates the preview control apparatus for this embodiment which inputs at the current time i a future target position instruction increment $\Delta r(i+M)$, and a control object position output increment $\Delta y(i-K)$ which was sampled K (where K is greater then or equal to zero) samples previously, and then inputs a speed instruction $v(i)$ to the speed controller. Here, $\Delta$ expresses the increment during sampling periods. Numeral 152 indicates the memory for storing the future target position instruction increment $\Delta r(i+m)$, numeral 153 indicates the memory for storing the constants $v_m$, $Q_0$, $Q_1$, $g_n$ and $E$, numeral 154 indicates the memory for storing the past speed instruction $v(i-n)$ and numeral 155 indicates the memory for storing the control object position output increment $\Delta y(i-K-1)$. Also, numeral 156 indicates the arithmetic unit where the speed instruction $v(i)$ is calculated according to the equation:

$$v(i) = \sum_{m=-k+1}^{M} v_m \Delta r(i+m) - Q_0 \Delta y(i-K) + Q_1 \Delta y(i-K-1) - \quad (13\text{-}1)$$

$$\sum_{n=1}^{N+K} g_n V(i-n) + Ee(i-K)$$

The numeral 157 indicates the subtracter which obtains the position deviation increment $\Delta e(i+K)$ from the target position instruction increment $\Delta r(i-K)$ and the control object position output increment and numeral 158 indicates the integrator which obtains the position deviation $e(i-K)$.

Here, deductions are made from equation (13-1). The first N samples $\{H_1, H_2, \ldots, H_N\}$ for the control object position output increment at the time of the inputting of the unit step instruction to the speed controller are sampled, and from that point on if it is assumed that the increment $h_n = H_n - H_{n-1}$ reduces at a constant rate P, a control target model can be obtained from the next equation.

$$\Delta y(i) = P\Delta y(i+1) + \sum_{n=1}^{N} b_n v(i-n) \quad (13\text{-}2)$$

$$b_n = Ph_n - h_{n-1}$$

Here, the future position output increment occurring at a time i can be estimated from $$\Delta y^*(i+m) = \Delta y(i+m) + \Delta y(i-K) - \Delta y(i-K) \quad (13\text{-}3)$$

or $$\Delta y^*(i+m) = \Delta y(i+m) \quad (13\text{-}4)$$

Now, a description will be given for the case where an estimate is obtained from equation (13-3). If the future speed instruction $v(i+m)=0$ ($m=1, 2, \ldots$), the estimate $\Delta y^*(i+m)$ for the future position output increment according to equations (13-2) and (13-3) can be estimated as being:

$$\Delta y^*(i+m) = P^{m+K}\Delta y(i-K) - P\Delta y(i-K-1) + \Delta y(i-K) + \quad (13\text{-}5)$$

$$h_m v(i) + \sum_{n=1}^{N+K} (h_{m+m} - P^{m+K}h_{n-K} - b_{n-K})v(i-n)$$

where $h_{N+j} = P^j h_N$ ($j \geq 1$). Moreover, if $\Delta \hat{y}$ is replaced with $\Delta y$ this becomes:

$$\Delta y^*(i+m) = (1+P^{m+K})\Delta y(i-K) - P\Delta y(i-K-1) + h_m v(i) + \quad (13\text{-}6)$$

-continued $$\sum_{n=1}^{N+K} (h_{n+m} - P^{m+K}h_{n-K} - b_{n-K})v(i-n)$$

It follows that the future position deviation increment estimate $\Delta e^*(i+m)$ is given by the following equation:

$$\Delta e^*(i+m) = \Delta r(i+m) - \Delta y^*(i+m) \quad (13\text{-}7)$$

and if the speed instruction $v(i)$ is selected so that the evaluation function $$J = \quad (13\text{-}8)$$

$$\sum_{m=1}^{M} W_m \left\{ \sum_{S=-K+1}^{m} \Delta e^*(i+s) + (1+\alpha)e(i-K) \right\}^2 + c \{v(i)\}^2$$

becomes a minimum, by putting $\partial J/\partial u(i)=0$, equation (13-1) can be obtained. Each of the constants $v_m$, $Q_0$, $Q_1$, $g_n$ and E can then be given by the next equations.

$$\left. \begin{aligned} W &= \sum_{j=1}^{M} w_j H_j^2 + c \\ q_m &= w_m H_m/W \\ V_m &= \sum_{s=m}^{M} q_s \\ Q_0 &= \sum_{m=-K+1}^{M} V_m(1+P^{m+K}) \\ Q_1 &= P \sum_{m=1}^{M} q_m(m+K) \\ E &= (1+\alpha)v_1 \\ g_n &= \sum_{m=-K+1}^{M} V_m\{h_{n+m} - (1+P^{m+K})h_{n-K} + Ph_{n-K-1}\} \end{aligned} \right\} \quad (13\text{-}9)$$

where $h_j=0$ $(j \leq 0)$ $h_{N+j}=P^jh_N$ $(j \geq 1)$

An actual measured value or a value simulated from an item such as the transmission function for the control object can be used as the sample series for the control object position output increment $\Delta y$ at the time the step instruction is inputted into the speed controller for the control object.

Also, for the case where the future position output increment is estimated from the equation (13-4), each of the constants $v_m$, $Q_0$, $Q_1$, $g_n$ and E can be given by the following equations.

$$\left. \begin{aligned} W &= \sum_{j=1}^{M} W_j H_j^2 + c \\ q_m &= w_m H_m/W \\ V_m &= \sum_{s=m}^{M} q_s \\ Q_0 &= \sum_{m=-K+1}^{M} V_m P^{m+K} \\ Q_1 &= 0 \\ E &= (1+\alpha)v_1 \\ g_n &= \sum_{m=-K+1}^{M} V_m\{h_{n+m} - P^{m+K}h_{n-K}\} \end{aligned} \right\} \quad (13\text{-}10)$$

Where $h_j=0$ $(j \leq 0)$, $h_{N+j}=P^jh_N$ $(j \geq 1)$

By substituting into equation (13-1) the following equation can be obtained.

$$v(i) = \sum_{m=-k+1}^{M} v_m \Delta r(i+m) - Q_0 \Delta y(i-K) + Q_1 \Delta y(i-K-1) - \quad (13\text{-}11)$$

$$g_1v(i-1) - \sum_{n=1}^{N+K-1} g_{n+1}\Delta v(i-n) + Ee(i-K)$$

In this case, the constant for preview control $g_n$ becomes, from equation (13-9), $$\left. \begin{aligned} f_j &= \sum_{m=-k+1}^{M} v_m\{h_{j+m} - (1+P^{m+K})h_{j-K} + Ph_{j-K-1}\} \\ g_n &= \sum_{j=n}^{N+K} f_j \end{aligned} \right\} \quad (13\text{-}12)$$

and from equation (13-10) becomes:

$$\left. \begin{aligned} f_j &= \sum_{m=-k+1}^{M} v_m(h_{j+m} - P^{m+K}h_{j-K}) \\ g_n &= \sum_{j=n}^{N+K} f_j \end{aligned} \right\} \quad (13\text{-}13)$$

The case where the control object speed output coincides with the target speed instruction can be thought of as being exactly the same as the case where control object position output coincides with the target position instruction. The speed instruction increment taken as the target instruction and the speed output increment is taken as the control object output. An actual measurement is taken of the control object speed output increment $\Delta y$ at the time of inputting the step instruction to the control object acceleration or torque controller, or obtained by simulation from the transfer function or, in the same way, could be deduced from the acceleration or torque instruction in the control equation.

As mentioned above, according to the present embodiment, a preview control apparatus can be realized where calculations can be carried out in less time while less memory is required to perform these calculations.

Next, an embodiment to attain the fourteenth object of this invention will be described with reference to FIG. 35.

In this diagram, the numeral 161 indicates the preview control apparatus for this embodiment which inputs at the current time i a future target instruction increment $\Delta r(i+M)$, and a control object position output increment $\Delta y(i-K)$ sampled K $(K \geq 0)$ samples previously, and then outputs a control input $u(i)$ to the control object. Here, $\Delta$ expresses the increment during sampling periods. Numeral 162 indicates the memory for storing the target instruction increment $\Delta r(i+m)$, numeral 163 indicates the memory for storing the constants $v_m$, $Q_0$, $Q_1$, $g_n$ and E, numeral 164 indicates the memory for storing the past control input increment $\Delta u(i-n)$ and numeral 165 indicates the memory for storing the control object output increment $\Delta y(i-K-1)$. Also, numeral 166 indicates the arithmetic unit where the control input increment $\Delta u(i)$ is calculated according to the equation:

$$\Delta u(i) = \sum_{m=-k+1}^{M} v_m \Delta r(i+m) - Q_0 \Delta y(i-K) + Q_1 \Delta y(i-K-1) - \quad (14\text{-}1)$$

$$\sum_{n=1}^{N+K} g_n \Delta u(i-n) + Ee(i-K)$$

The numeral 167 indicates the integrator which obtains the control input $u(i)$ from $\Delta u(i)$, numeral 168 indicates the subtracter which obtains the deviation increment $\Delta e(i-K)$ from the target instruction increment $\Delta t(i-K)$ and the control object output increment $\Delta y(i-K)$ and numeral 169 indicates the integrator which obtains the deviation $e(i-K)$ from $\Delta e(i-K)$.

Here, deductions are made from equation (14-1). The first N samples $\{H_1, H_2, \ldots, H_N\}$ for the control object unit step response are sampled, and from that point on if it is assumed that the increment $h_n = H_n - H_{n-1}$ reduces at a constant rate P, a control object model can be obtained from the next equation.

$$\Delta \hat{y}(i) = P \Delta \hat{y}(i-1) + \sum_{n=1}^{N} b_n u(i-n) \qquad (14\text{-}2)$$

$$b_n = h_n - P h_{n-1}$$

Here, the future output increment occurring at time i can be estimated by the following equation.

$$\Delta y^*(i+m) = \Delta \hat{y}(i+m) + \Delta y(-K) - \Delta \hat{y})(i+K) \qquad (14\text{-}3)$$

By making $\Delta u(i+m)=0$ (m=1, 2, ...) the future output increment estimate $\Delta y^*(i+m)$ according to equations (14-2) and (14-3) can be estimated by:

$$\Delta y^*(i+m) = P^{m+K} \Delta \hat{y}(i-K) - P \Delta \hat{y}(i-K-1) + \Delta y(i-K) + \qquad (14\text{-}4)$$
$$h_m \Delta u(i) + \sum_{n=1}^{N+K} (h_{m+n} - P^{m+K}h_{n-K} - b_{n-K})\Delta u(i-n)$$

where $h_{N+j}=P^j h_N$ ($j \geq 1$). Further, replacing $\Delta \hat{y}$ with $\Delta y$ this becomes:

$$\Delta y^*(i+m) = (1 + P^{m+K})\Delta y(i-K) - P\Delta y(i-K-1) + \qquad (14\text{-}5)$$
$$h_m \Delta u(i) + \sum_{n=1}^{N+K} (h_{m+n} - P^{m+K}h_{n-K} - b_{n-K})\Delta u(i-n)$$

It follows that the future deviation increment estimate $\Delta e^*(i+m)$ is given by the following equation:

$$\Delta e^*(i+m) = \Delta r(i+m) - \Delta y^*(i+m) \qquad (14\text{-}6)$$

and if the control input increment $\Delta u(i)$ is selected so that the evaluation function $$J = \sum_{m=1}^{M} W_m \left\{ \sum_{S=-K+1}^{m} \Delta e^*(i+s) + (1+\alpha)e(i-K) \right\}^2 + c\{\Delta u(i)\}^2 \qquad (14\text{-}7)$$

becomes a minimum, by putting $\partial J/\partial u(i)=0$ equation (14-1) can be obtained. Each of the constants $v_m$, $Q_0$, $Q_1$, $g_n$ and E can then be given by the next equations, $$\left. \begin{array}{l} W = \sum_{j=1}^{M} w_j H_j^2 + c \\[4pt] q_m = w_m H_m/W \\[4pt] V_m = \sum_{s=m}^{M} q_s \\[4pt] Q_0 = \sum_{m=-K+1}^{M} V_m(1 + P^{m+K}) \\[4pt] Q_1 = P \sum_{m=1}^{M} q_m(m+K) \\[4pt] E = (1+\alpha)v_1 \\[4pt] g_n = \sum_{m=-K+1}^{M} V_m\{h_{m+n} - (1+P^{m+K})h_{n-K} + Ph_{n-K-1}\} \\[4pt] h_j = 0 (j \leq 0), h_{N+j} = P^j h_N (j \geq 1) \end{array} \right\} \qquad (14\text{-}8)$$

where $h_j=0$ ($j \leq 0$), $h_{N+j}=P^j h_N$ ($j \geq 1$)

An actual measured value or a value simulated from the transfer function for the control object can be used as the control object step response sample series.

As mentioned above, according to the present embodiment, a preview control apparatus can be realized where calculations can be carried out in less time while less memory is required to perform these calculations.

Figure 36:
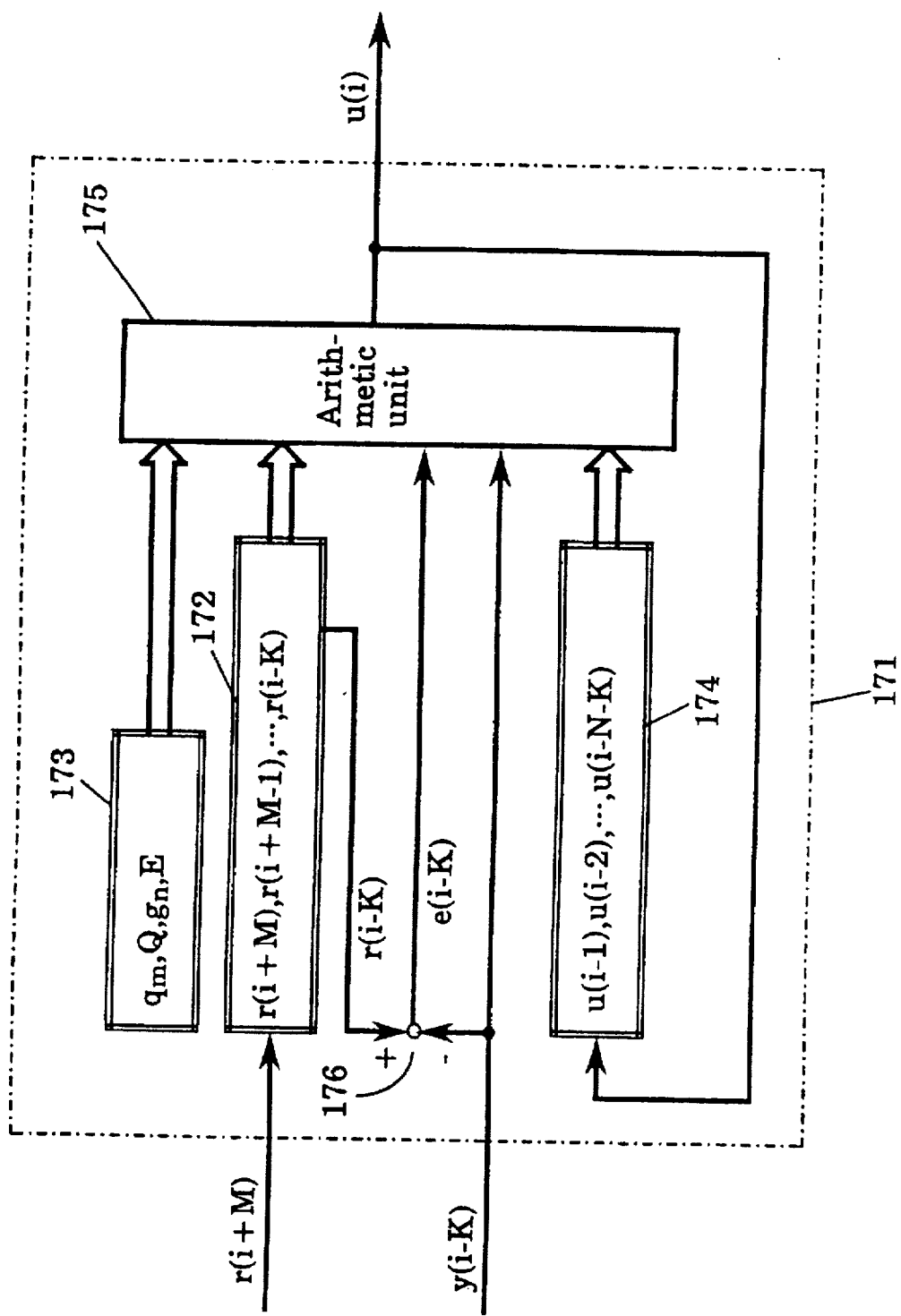
FIG. 36 is a block diagram of a fifteenth embodiment of this invention.

Next, an embodiment to attain the fifteenth object of this invention will be described with reference to FIG. 36.

In this diagram, the numeral 171 indicates the preview control apparatus for this embodiment which inputs at the current time i a future target speed instruction r(i+M), and a control object speed output y(i−K) sampled K (where K≥0) samples previously, and then outputs an acceleration or torque instruction u(i) to the acceleration or torque controller. Numeral 172 indicates the memory for storing the target speed instruction r(i+m) (m=−K, −K+1, ..., M), numeral 173 indicates the memory for storing the constants $q_m$, Q, $g_n$ and E and numeral 174 indicates the memory for storing the past acceleration or torque instruction u(i−n). Also, numeral 175 indicates the arithmetic unit where the acceleration or torque instruction u(i) is calculated according to the equation:

$$u(i) = \sum_{m=1}^{M} q_m r(i+m) - Qy(i-K) - \sum_{n=1}^{N+K-1} g_n u(i-n) + Ee(i-K) \qquad (15\text{-}1)$$

The numeral 176 indicates the subtracter which obtains the speed deviation e(i−K) from the target speed instruction r(i−K) and the control object speed output y(i−K).

Here, deductions are made from equation (15-1). The control object speed output can be shown to be $$\hat{y}(i-K) = H_1 u(i-K-1) + H_2 u(i-K-1) + \ldots + H_N u(I-K-N) + \ldots \qquad (15\text{-}2)$$

where $H_j$ (j=1, 2, ..., N) is the increment for the control object speed output y(i) at the time of inputting the unit step instruction into the accelerator or torque controller. Here, the future speed output occurring at time i can be estimated from the following equation.

$$y^*(i+m) = \hat{y}(i+m) + y(i-K) - \hat{y}(i-K) \qquad (15\text{-}3)$$

If the future speed output u(i+j) (j=1, 2, ...) is made equal to zero, the equation $$y^*(i+m) = y(i-K) + H_m u(i) + \sum_{n=1}^{N+K-1} (H_{n+m} - H_{n-K})u(i-n) \qquad (15\text{-}4)$$

can be acquired from equation (15-2) and equation (15-3), where n is chosen to be sufficient for $H_j$ to become constant. It follows that the future speed deviation increment e*(i+m) can be shown to be $$\begin{aligned} e^*(i+m) &= r(i+m) - y^*(i+m) \qquad (15\text{-}5) \\ &= r(i+m) - y(i-K) - H_m u(i) - \\ &\quad \sum_{n=1}^{N+K-1} (H_{n+m} - H_{n-K})u(i-n) \end{aligned}$$

and if the acceleration or torque instruction u(i) for this time is chosen so that the evaluation function $$J = \sum_{m=1}^{M} W_m \{e^*(i+m) + \alpha e(i-K)\}^2 + c\{u(i)\}^2 \qquad (15\text{-}6)$$

becomes a minimum, by putting $\partial J/\partial u(i)=0$, equation (15-1) can be obtained. Each of the constants $q_m$, Q, $g_n$ and E can then be given by the following equations.

$$\left. \begin{array}{l} W = \sum_{j=1}^{M} W_j H_j^2 + c \\ q_m = w_m H_m/W \\ Q = \sum_{m=1}^{M} q_m \\ g_n = \sum_{m=1}^{M} q_m(H_{n+m} - H_{n-K}) \\ E = \alpha Q \end{array} \right\} \quad (15\text{-}7)$$

An actual measured value or a value simulated from an item such as the transmission function for the acceleration or torque controller and the control object can be used with the unit step response sample series for the accelerator or torque controller and the control object.

Next, a case where data increments are handled will now be described. In this case, the future target speed instruction increment taken to be the target instruction and the speed output increment taken to be the control object speed output are inputted, and the future speed output increment $\Delta y^*(i+m)$ can be estimated by $$\begin{array}{rl} \Delta y^*(i+m) &= \Delta \hat{y}(i+m) + \Delta y(i-K) - \Delta y(i-K) \\ &= \Delta y(i-K) + H_m \Delta u(i) + \\ & \sum_{n=1}^{N+K-1} (H_{n+m} - H_{n-K})\Delta u(i-n) \end{array} \quad (15\text{-}8)$$

Then, if the transfer function $$J = \sum_{m=1}^{M} W_m \left\{ \sum_{s=-K+1}^{m} \Delta e^*(i+s) + (1+\alpha)e(i-K) \right\}^2 + \quad (15\text{-}9)$$

$$c \{\Delta u(i) + u(i-1)\}^2$$

or $$J = \sum_{m=1}^{M} W_m \left\{ \sum_{s=-K+1}^{m} \Delta e^*(i+s) + (1+\alpha)e(i-K) \right\}^2 + c \{\Delta u(i)\}^2 \quad (15\text{-}10)$$

is made to become a minimum, by setting $\partial J/\partial \Delta u(i)=0$, the acceleration or torque instruction increment $\Delta u(i)$ can be obtained from the next equation, and u(i) can then be obtained by integration.

$$\Delta u(i) = \sum_{m=-k+1}^{M} v_m \Delta r(i+m) - Q \Delta y(i-K) - \quad (15\text{-}11)$$

$$\sum_{n=1}^{N+K-1} g_n \Delta u(i-n) + Ee(i-K) - Fu(i-1)$$

whereby for the case where the evaluation function in equation (15-9) is used, the constants for the preview control can be given by the following equations.

$$\left. \begin{array}{l} L_m = \sum_{s=1}^{m} H_s \\ W = \sum_{j=1}^{M} W_j L_j^2 + c \\ q_m = w_m L_m/W \\ V_m = \sum_{s=m}^{M} q_s \\ Q = \sum_{m=1}^{M} q_m(m+K) \\ g_n = \sum_{m=-K+1}^{M} v_m(H_{n+m} - H_{n-K}) \\ E = (1+\alpha)v_1 \\ F = c/W \end{array} \right\} \quad (15\text{-}12)$$

Also, for the case where equation (15-10) is used as the evaluation function, in equation (15-12) F will become zero.

In the above, instead of using the equation (15-8) to estimate the future speed output increment $\Delta y^*(i+m)$, the estimation method in the next equation could be used:

$$\begin{array}{rl} \Delta y^*(i+m) &= \Delta \hat{y}(i+m) \\ &= h_m u(i) + \sum_{n=1}^{N-m} h_{n+m} u(i-n) \end{array} \quad (15\text{-}13)$$

where $h_m = H_m - H_{m-1}$.

Then, by making the evaluation function in equation (15-9) and equation (15-10) a minimum and then setting $\partial J/\partial u(i)=0$, the acceleration or torque instruction u(i) can be obtained from the following equations.

$$u(i) = \sum_{m=-k+1}^{M} v_m \Delta r(i+m) - \sum_{n=1}^{N+K-1} g_n u(i-n) + Ee(i-K) \quad (15\text{-}14)$$

or $$u(i) = \quad (15\text{-}15)$$

$$\sum_{m=-k+1}^{M} v_m \Delta r(i+m) - g_1 u(i-1) + \sum_{n=1}^{N+K-2} g_{n+1} \Delta u(i-n) + Ee(i-K)$$

In these equations, using the evaluation function in equation (15-9) the constants for preview control by equation (15-14) are given to be $$\left. \begin{array}{l} W = \sum_{j=1}^{M} w_j H_j^2 + c \\ q_m = w_m H_m/W \\ V_m = \sum_{s=m}^{M} q_s \\ g_n = \sum_{m=-K+1}^{M} V_m h_{n+m} \quad h_{n+m} = 0 \ (n+m>N) \\ E = (1+\alpha)v_1 \end{array} \right\} \quad (15\text{-}16)$$

and in the same way by equation (15-15) are given to be $$W = \sum_{j=1}^{M} w_j H_j^2 + c$$

$$q_m = w_m H_m / W$$

$$V_m = \sum_{s=m}^{M} q_s$$

$$f_j = \sum_{m=-K+1}^{M} V_m h_{j+m} \quad h_{j+m} = 0 \ (j+m > N)$$

$$g_n = \sum_{j=n}^{N+K-1} f_j$$

$$E = (1 + \alpha) v_1$$

(15-17)

Also, when using the evaluation function in equation (15-10), $g_1 = g_1 + c/W$ can be used in equation (15-16) and (15-17), respectively.

When u(i) has been decided in the above method it can then be output to the acceleration or torque controller for the control object.

In the above method, according to this embodiment, a preview control apparatus can be realized which can be applied to a case where speed control is carried out by obtaining an acceleration or torque instruction from a speed instruction.

Figure 37:
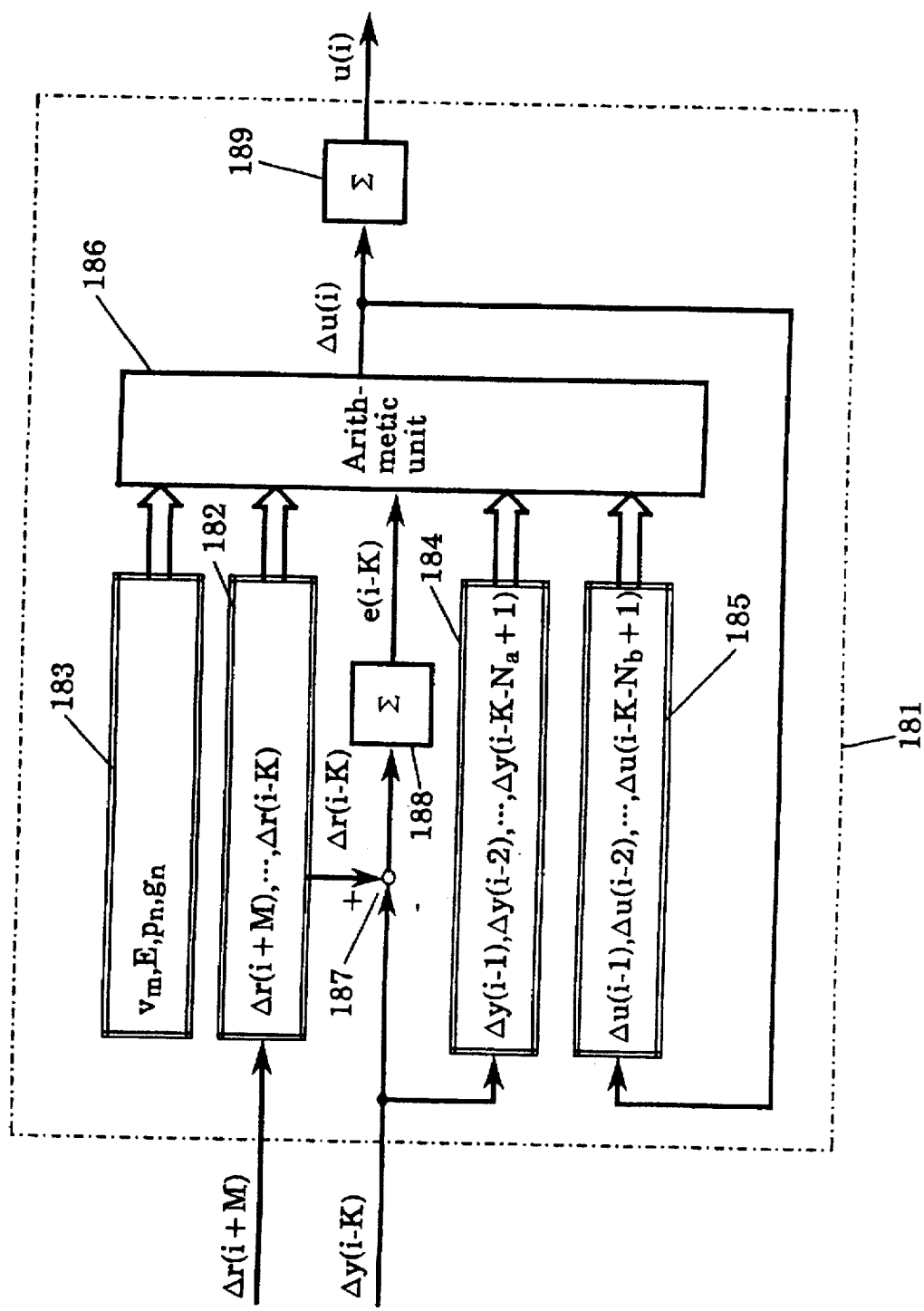
FIG. 37 is a block diagram of a sixteenth embodiment of this invention.

Next, an embodiment to attain the sixteenth object of this invention will be described with reference to FIG. 37. In this diagram, the numeral 181 indicates the preview control apparatus for this embodiment which inputs at the current time i a future target instruction increment $\Delta r(i+M)$, and a control object output increment $\Delta y(i-K)$ which was sampled K (where $K \geq 0$) samples previously, and then outputs a control input u(i) to the control object. Numeral 182 indicates the memory for storing the target instruction increment $\Delta r(i+K), \ldots, \Delta r(i+M)$, numeral 183 indicates the memory for storing the constants $E, v_1, \ldots, v_M, p_0, \ldots, p_{Na-1}, g_1, \ldots, g_{Nb+K-1}$, numeral 184 indicates the memory for storing the output increment $\Delta y(i-K), \ldots, \Delta y(i-K-Na+1)$ and numeral 185 indicates the memory for storing the past control input increment $\Delta u(i-1), \ldots, \Delta u(i-K-Nb+1)$. The numeral 187 indicates the subtracter which obtains the deviation increment $\Delta e(i-K)$ from the target instruction increment $\Delta r(i-K)$ stored in the memory 182 and the control object output increment $\Delta y(i-K)$ and numeral 188 indicates the integrator which obtains the deviation $e(i-K)$ from $\Delta e(i-K)$. Also, numeral 186 indicates the arithmetic unit where the control input increment $\Delta u(i)$ is calculated according to the equation:

$$\Delta u(i) = \sum_{m=-k+1}^{M} v_m \Delta r(i+m) - \sum_{n=0}^{Na-1} P_n \Delta y(i-K-n) + E e(i-K) -$$

$$\sum_{n=1}^{Nb+K-1} g_n \Delta u(i-n)$$

(16-1)

The calculated $\Delta u(i)$ is stored in the memory 185 and input to the integrator 189. The control input u(i) obtained by the integrator 189 is then output to the control object as an output from the preview control apparatus 181.

Here, deductions are made from equation (16-1). Now, if the control object transform function model is obtained by the dispersion time model $$G_P(z) = \frac{b_1 z^{-1} + \ldots + b_{Nb} z^{-Nb}}{1 - a_1 z^{-1} - \ldots - a_{Na} z^{-Na}}$$

this input/output increment model becomes the following equation.

$$\Delta \hat{y}(i) = \sum_{n=1}^{Na} a_n \Delta \hat{y}(i-n) + \sum_{n=1}^{Nb} b_n \Delta u(i-n) \quad (16-2)$$

where $\Delta$ indicates the sampling period increment.

At a time i, as an actual measured value $\Delta y(i-n)$ ($n \geq K$) can be obtained for the output increment up until the time i–K, by using an actual measured value for the output increment from this point on to estimate $$\Delta y^*(i-K+1) = \sum_{n=1}^{Na} a_n \Delta y(i-K+1-n) + \sum_{n=1}^{Nb} b_n \Delta u(i-K+1-n) \quad (16-3a)$$

$$m = -K + 1$$

$$\Delta y^*(i-m) = \sum_{n=1}^{m+K-1} a_n \Delta y^*(i+m-n) + \quad (16-3b)$$

$$\sum_{n=m+K}^{Na} a_n \Delta y(i+m-n) + \sum_{n=1}^{Nb} b_n \Delta u(i+m-n)$$

$$m > -K + 1$$

the output increment estimate $\Delta y^*(i+m)$ becomes the following equation.

$$\Delta y^*(i+m) = \sum_{n=K}^{Na+K-1} A_{mn} \Delta y(i-n) + \sum_{n=0}^{Nb+k-1} B_{mn} \Delta u(i-n) \quad (16-4)$$

$$m \leq -K + 1$$

Here, by making the future control input increment $\Delta u(j) = 0$ (j>i), the coefficients $A_{mn}$ and $B_{mn}$ can be given by:

$$A_{(-K+1)n} = a_{(n-K+1)} \quad m = -K+1, K \leq n \leq Na + K - 1 \quad (16-5a)$$

$$A_{mn} = \sum_{j=1}^{m+K-1} a_j A_{(m-j)n} + a_{(n+m)} \quad m > -K \leq n \leq Na + K - 1 \quad (16-5b)$$

$$B_{(-K+1)n} = b_{(n-K+1)} \quad m = -K+1, 0 \leq n \leq Nb + K - 1 \quad (16-6a)$$

$$B_{mn} = \sum_{j=1}^{m+K-1} a_j B_{(m-j)n} + b_{(n+m)} \quad m > -0 \leq n \leq Nb + K - 1 \quad (16-6b)$$

$$a_n = 0 \ (n > N_a), \ b_n = 0 \ (n < 1 \text{ and } n > N_b)$$

Here, the future deviation estimate $e^*(i+m)$ is given by:

$$e^*(i+m) = \sum_{s=-K+1}^{m} \{\Delta r(i+s) - \Delta y^*(i+s)\} + e(i-K) \quad (16-7)$$

$$1 \leq m \leq M$$

so if the control input increment $\Delta u(i)$ is selected so that the evaluation function $$J = \sum_{m=1}^{M} w_m \{e^*(i+m) + \alpha e(i-K)\}^2 + c\{\Delta u(i)\}^2 \quad (16-8)$$

becomes a minimum, by making $\partial J/\partial \Delta u(i)=0$ equation (16-1) can be obtained. Each of the constants $V_m, p_n, E$ and $g_n$ are given by the following equations.

$$\beta_s = \sum_{j=1}^{s} B_{js}, \quad W = \sum_{s=1}^{M} w_s\beta_s^2 + c \quad q_s = w_s\beta_s/W$$

$$V_m = \sum_{s=m}^{M} q_s, \quad m = -K+1, -K+2, \ldots, M$$

$$E = (1+\alpha)v_1 \qquad (16\text{-}9)$$

$$P_n = \sum_{m=-K+1}^{M} v_m A_{m(n+K)} \quad n = 0, 1, \ldots, N_a - 1$$

$$g_n = \sum_{m=-K+1}^{M} v_m B_{mn} \quad n = 1, 2, \ldots, N_b + K - 1$$

Also, by replacing the transfer function in equation (16-8) with $$J = \sum_{m=1}^{M} w_m \{e^*(i+m) + \alpha e(i-K)\}^2 + c\{u(i-1) + \Delta u(i)\}^2 \qquad (16\text{-}8')$$

equation (16-1) becomes:

$$\Delta u(i) = \sum_{m=-k+1}^{M} v_m \Delta r(i+m) - \sum_{n=0}^{N_a-1} p_n \Delta y(i-K-n) + Ee(i-K) - \qquad (16\text{-}1')$$

$$\sum_{n=1}^{N_b+K-1} g_n \Delta u(i-n) - (c/W)u(i-1)$$

It follows that for this case, the past control input u(i−1) and the constant F=c/W can be stored in the memory, and Δu(i) can then be calculated according to equation (16-1')

In the above method, according to this embodiment, a preview control apparatus can be realized which has a more accurate tracking function corresponding to the late detection of a control object output while the carrying out of this function requires less memory and fewer calculations.

With the preview control apparatus described above, a filter can be used in the target instruction in order to apply an impulse to the control object. For example, if the method in Japanese Patent Application No. 4-59677 is used, the filtered target instruction is:

$$r_f(i) = \sum_{j=-k_f}^{k_f} f_j r(i+j)$$

where $f_j$ is given to be the $(2k_f+1)$th filter coefficient and the right hand side of the control signal deciding equation in Claim 3, 5, 14, 23, 26 or 39, $$\sum_{m=1}^{M} q_m r(i+m)$$

becomes $$\sum_{m=-k_f+1}^{M+k_f} q'_m r(i+m)$$

where $$q'_m = \sum_{j=1}^{M} q_j f_{m-j} \quad f_n = 0 \ (n < -k_f, n > k_f)$$

The right hand side of the control signal deciding equation in Claim 7, 10, 12, 16, 18, 29, 30, 31, 32, 33, 35, 36, 37, 38 or 39:

$$\sum_{m=-K+1}^{M} v_m \Delta r(i+m)$$

becomes $$\sum_{m=-k_f+1}^{M+k_f} v'_m \Delta r(i+m)$$

where $$v'_m = \sum_{j=1}^{M} v_j f_{m-j} \quad f_n = 0 \ (n < -k_f, n > k_f)$$

INDUSTRIAL APPLICABILITY

This invention can be applied to the control of items such as construction machinery and robots.

We claim:

1. A preview control apparatus for deciding a control input, which is to be outputted to a control object every predetermined sampling period, in such a manner that a future deviation estimate obtained from a model of the control object is minimized so that the output of the control object coincides with a target instruction, characterized in that said preview control apparatus comprises:
   (a) means for inputting a future target instruction and a control object output;
   (b) means for storing said future target instruction, a preview control constant and a past control input;
   (c) means for obtaining a deviation according to the difference between said target instruction and said control object output; and
   (d) means for calculating a control input to be outputted to said control object, in such a manner that an evaluation function including at least a squared weighting of said future deviation estimate is minimized, from inputs including said future target instruction, said control object output, said past control input, and said deviation, and the model of said control object wherein said inputs exclude deviations calculated from differences of past control object outputs and past target instructions.

2. A preview control apparatus which takes as its input a future target instruction and a control object output x(i) and outputs to a control object a control input u(i) so that the output of the control object coincides with a target instruction, characterized in that said preview control apparatus comprises:

means for storing a future target instruction r(i+m) (m=1, 2, . . . , M);

means for storing a past control input u(i−n) (n=1, 2, . . . , M); and means for deciding a control input u(i) so that an evaluation function $$J = \sum_{m=1}^{M} W_m \{e^*(i+m)\}^2$$

relating to a future deviation estimate e*(i+m) (m=1, 2, . . . , M) obtained from a model where a control object is made to be $$x(i) = Px(i-1) + \sum_{n=1}^{N} b_n u(i-n)$$

$$b_n = h_n - Ph_{n-1}$$

where $H_n$ is the unit step response for the sample, $h_n = H_n - H_{n-1}$ and P is the damping ratio for $h_n$ (n>N), becomes a minimum.

3. A preview control apparatus according to claim 2, characterized by further comprising means for storing preview control constants $q_m$ (m=1, 2, ..., M), Q and $g_n$ (n=1, 2, ..., N−1) and deciding a control input u(i) according to $$u(i) = \sum_{m=1}^{M} q_m r(i+m) - Qx(i) - \sum_{n=1}^{N-1} g_n u(i-n).$$

4. A preview control apparatus which takes as its input a future target instruction and a control object output x(i) and outputs to a control object a control input u(i) so that the output of the control object coincides with a target instruction, characterized in that said preview control apparatus comprises:

means for storing a future target instruction r(i+m) and a past control input u(i−n); and means for deciding a control input u(i) so that an evaluation function $$J = \sum_{m=1}^{M} W_m\{e^*(i+m)\}^2$$

relating to a future deviation estimate e*(i+m) (m=1, 2, ..., M) obtained from a model where a control object is made to be $$x(i) = \sum_{n=1}^{N} h_n u(i-n)$$

where $h_n$ is the step response sample increment, becomes a minimum.

5. A preview control apparatus according to claim 4, characterized by further comprising means for storing preview control constants $q_m$ and $g_n$ and deciding a control input u(i) according to $$u(i) = \sum_{m=1}^{M} q_m r(i+m) - \sum_{n=1}^{N-1} g_n u(i-n).$$

6. A preview control apparatus which takes as its input a future target instruction increment and a control object output increment Δy(i) and outputs to a control object a control input u(i) or it's increment Δu(i) so that the output of the control object coincides with a target instruction, characterized in that said preview control apparatus comprises:

means for storing a future target instruction Δr(i+m) and a past control input increment Δu(i−n);

means for obtaining deviation e(i); and means for deciding a control input increment Δu(i) so that an evaluation function, $$J = \sum_{m=1}^{M} W_m \left\{ \sum_{s=1}^{m} \Delta e^*(i+s) + e(i) \right\}^2$$

where Δ is the increment operation during sampling periods, relating to a future deviation increment estimate Δe*(i+m) and deviation e(i) obtained from information relating to the motion characteristics of the control target, becomes a minimum.

7. A preview control apparatus according to claim 6, characterized by further comprising means for storing preview control constants $v_m$, Q, $g_n$ and E and deciding a control input increment Δu(i) according to $$u(i) = \sum_{m=1}^{M} v_m \Delta r(i+m) - Q\Delta y(i) - \sum_{n=1}^{N-1} g_n \Delta u(i-n) + Ee(i)$$

8. A preview control apparatus which takes as its input a future target instruction increment and a control object output increment Δy(i−K) which was sampled K (K≧0) samples previously and outputs to a control object a control input u(i) or it's increment Δu(i) so that the output of the control object coincides with a target instruction, characterized in that said preview control apparatus comprises:

means for storing a target instruction increment Δr(i+m) (m=−K, ..., M) and a past control input increment Δu(i−n) (n=1, 2, ..., N+K−1);

means for obtaining deviation e(i−K); and means for deciding a control input increment Δu(i) so that an evaluation function, $$J = \sum_{m=1}^{N} W_m \left\{ \sum_{s=-K+1}^{m} \Delta e^*(i+s) + e(i-K) \right\}^2$$

relating to a future deviation increment estimate Δe*(i+m) and deviation e(i−K) obtained from information relating to the motion characteristics of the control target, becomes a minimum.

9. A preview control apparatus according to claim 8, characterized by further comprising an evaluation function made to be $$J = \sum_{m=1}^{M} W_m \left\{ \sum_{s=-K+1}^{m} \Delta e^*(i+s) + e(i-K) \right\}^2 + C\{\Delta u(i)\}^2.$$

10. A preview control apparatus according to claim 8 or 9 characterized by further comprising means for storing preview control constants $v_m$, Q, $g_n$ and E and deciding a control input increment Δu(i) according to Δu(i) =

$$\sum_{m=-K+1}^{M} v_m \Delta r(i+m) - Q\Delta y(i-k) - \sum_{n=1}^{N+K-1} g_n \Delta u(i-n) + Ee(i-K).$$

11. A preview control apparatus which takes as its input a future target instruction increment and a control object output increment Δy(i−K) sampled K(K≧0) samples previously and outputs to a control object a control input u(i+1) or it's increment Δu(i+1) so that the output of the control object coincides with a target instruction characterized in that said preview control apparatus comprises:

means for storing a target instruction increment Δr(i+m) and a past control input increment Δu(i−n);

means for obtaining deviation e(i−K); and means for deciding a control input increment Δu(i+1) so that an evaluation function, $$J = \sum_{m=1}^{M} W_m \left\{ \sum_{s=-K+1}^{m} \Delta e^*(i+s) + e(i-K) \right\}^2 + C\{\Delta u(i+1)\}^2$$

relating to a future deviation increment estimate Δe*(i+m) and deviation e(i−K) obtained from information relating to the motion characteristics of the control target, becomes a minimum.

12. A preview control apparatus according to claim 11, characterized by further comprising means for storing preview control constants $v_m$, Q, $g_n$ and E and deciding a control input increment $\Delta u(i+1)$ according to $\Delta u(i + 1) =$ $$\sum_{m=-K+1}^{M} v_m \Delta r(i+m) - Q\Delta y(i-k) - \sum_{n=0}^{N+K-1} g_n \Delta u(i-n) + Ee(i-K).$$

13. A preview control apparatus which takes as its input a future target instruction and a control object output y(i) and outputs to a control object speed controller a speed instruction v(i) so that the output of the control object coincides with a target instruction characterized in that said preview control apparatus comprises:

means for storing a future target instruction r(i+m) and a past speed instruction v(i−n); and means for deciding a speed instruction v(i) so that an evaluation function, $$J = \sum_{m=1}^{M} W_m \{e^*(i+m) + Ae(i)\}^2 + C\{v(i)\}^2$$

relating to a future deviation increment estimate $e^*(i+m)$ deviation e(i) and the speed instruction v(i) obtained from information relating to the motion characteristics of the control target, becomes a minimum.

14. A preview control apparatus according to claim 13, characterized by further comprising means for storing preview control constants $q_m$, Q, $g_n$ and E and deciding a speed instruction v(i) according to $$v(i) = \sum_{m=1}^{M} q_m r(i+m) - Qy(i) - \sum_{n=1}^{N-1} g_n v(i-n) + Ee(i).$$

15. A preview control apparatus which takes as its input a future target instruction increment and a control object output increment $\Delta y(i)$ and outputs to a control object speed controller a speed instruction v(i) so that the output of the control object coincides with a target instruction characterized in that said preview control apparatus comprises:

means for storing a future target instruction increment $\Delta r(i+m)$, a past speed instruction increment $\Delta v(i-n)$ and a speed instruction v(i−1);

means for deciding a speed instruction increment v(i) so that an evaluation function, $$J = \sum_{m=1}^{M} W_m \left\{ \sum_{s=1}^{m} \Delta e^*(i+s) + Ae(i) \right\}^2 + C\{v(i)\}^2$$

relating to a future deviation increment estimate $\Delta e^*(i+m)$ deviation e(i) and the speed instruction v(i) obtained from information relating to the motion characteristics of the control target, becomes a minimum; and means for integrating $\Delta v(i)$ to produce a speed instruction v(i).

16. A preview control apparatus according to claim 15, characterized by further comprising means for storing preview control constants $v_m$, Q, $g_n$, E and F and deciding a speed instruction $\Delta v(i)$ according to $\Delta v(i) =$ -continued $$\sum_{m=1}^{M} v_m \Delta r(i+m) - Q\Delta y(i) - \sum_{n=1}^{N-1} g_n \Delta v(i-n) + Ee(i) - Fv(i-1).$$

17. A preview control apparatus which takes a future time target instruction and a control object output as input and outputs a control input to a control object so that the output of the control object, having two constituent integral portions between its input and output, coincides with a target instruction, characterized in that said preview control apparatus comprises:

storage means for a future target instruction, preview control constants and a past control input;

means for obtaining a deviation from a difference between a target instruction and a control object output; and means for deciding a control input so that an evaluation function derived from a squared weighting of the future deviation estimate and control input becomes a minimum, said future deviation estimate being derived from information relating to said deviation, said future target instruction, said control object output, said past control input, and control object motion characteristics; and wherein said control object output excludes past control object outputs and past deviations.

18. A preview control apparatus which takes a future time target instruction and a control object output as input and outputs a control input to a control object so that the output of the control object having two constituent integral portions between its input and output coincides with a target instruction, said preview control apparatus comprising:

storage means for a future target instruction, preview control constants and a past control input;

means for obtaining a deviation from a difference between a target instruction and a control object output;

means for determining a control input so that an evaluation function derived from a squared weighting of the future deviation estimate and control input derived from information relating to the deviation, future target instruction, control object output, past control input, and control object motion characteristics, becomes a minimum; and a means for obtaining a present time control input u(i)

$$u(i) = \sum_{m=1}^{M} v_m \Delta r(i+m) - Q\Delta y(i) + Ee(i) - \sum_{n=1}^{N-1} g_n u(i-n)$$

where $v_m$, Q, $g_n$ and E are preview control constants and $\Delta$ is the increment calculation during sampling periods by making the evaluation function $$J = \sum_{m=1}^{M} W_m \{e^*(i+m) + \alpha e(i)\}^2 + C\{u(i)\}^2$$

relating to a deviation estimate $e^*$ until M sample periods in the future, a current deviation e(i) and a control input u(i).

19. A preview control apparatus according to claim 17 further comprising a motor and controller for a control object to take a torque instruction or acceleration instruction as input and output a position.

20. A preview control apparatus according to claim 17, further characterized in that preview control constants are obtained by taking values simulated from, for example, the real side of the incremental series for the unit step response of the control object or the transfer function of the control object as information which relates to the drive characteristics of the control object.

21. A preview control apparatus according to claim 17, characterized in that preview control constants are obtained by taking the gain and sampling period of the control object as information, which relates to the drive characteristics of the control object.

22. A preview control apparatus according to claim 17, characterized in that preview control constants are obtained by taking the gain of a torque controller, the inertia between a motor and a load and the sampling period as information, which relates to the drive characteristics of the control object.

23. A preview control apparatus which takes as its input with respect to a current time i, a target instruction r(i+M) for M samples in the future and a control object output y(i−K) for K (K>0) samples previously and outputs a control input u(i) to a control object so that the output of a control object coincides with a target instruction, characterized in that said preview control apparatus comprises:

means for storing a target instruction, a preview control constant, a past output and a control input;

means for obtaining a tracking deviation from the difference between a target instruction and a control object output; and means for obtaining a current time control input according to $$u(i) = \sum_{m=1}^{M} q_m r(i+m) - Q_0 y(i-K) +$$

$$Q_1 y(i-K-1) + Ee(i-K) - \sum_{n=1}^{N+K} g_n u(i-n)$$

where $q_m$, $Q_0$, $Q_1$, $g_n$ and E are preview control constants.

24. A preview control apparatus which takes as its input with respect to a current time i, a target instruction r(i+M) for M samples in the future and a control object output y(i−K) for K(K≧0) samples previously and outputs a control input u(i) to a control object so that the output of control object having a transfer function model $$G_P(Z) = \frac{b_1 z^{-1} + \ldots + b_{Nb} z^{-Nb}}{1 - a_1 z^{-1} - \ldots - a_{Na} z^{-Na}}$$

coincides with a target instruction, characterized in that said preview control apparatus comprises:

means for storing a target instruction, a preview control constant, a past output and a control input;

means for obtaining a tracking deviation from the difference between a target instruction and a control object output; and means for deciding a current time control input u(i) so that a transfer function $$J = \sum_{m=1}^{M} w_m \{e^*(i+m) + \alpha e(i-K)\}^2 + c\{\Delta u(i)\}^2$$

relating to a deviation estimate e* for M sampling periods into the future, the deviation e(i−K) and the control input u(i) becomes a minimum according to the deviation, future target instruction, past output, past control input and the transfer function for the control object.

25. A preview control apparatus according to claim 24, characterized in that the evaluation function is made to be $$J = \sum_{m=1}^{M} W_m \{e^*(i+m) + \alpha e(i-K)\}^2 + c\{u(i) - u(i-1)\}^2$$

26. A preview control apparatus according to claim 24 and claim 25 further characterized by comprising means for deciding a current control input u(i) according to $$\Delta u(i) = \sum_{m=1}^{M} q_m r(i+m) - \sum_{n=0}^{Na} p_n y(i-K-n) + Ee(i-K) -$$

$$\sum_{n=1}^{Nb+K} g_n \Delta u(i-n)$$

where $q_m$, $p_n$, E and $g_n$ are preview control constants.

27. A preview control apparatus comprising:

means for inputting a future time target instruction, a control target output and model information associated with a control object model identifier; and means for producing a control input derived from data including said future time target instruction, said control target output and said model information associated with said control object model identifier, and excluding prior deviations in such a manner that a future deviation estimate becomes a minimum and then outputting said control input to a control object, and wherein the output of the control object coincides with a target.

28. A preview control apparatus according to claim 27, characterized in that the model identifier for the control object is internal.

29. A preview control apparatus which takes as its input with respect to a current time i, a target position instruction increment Δr(i+M) for M samples in the future and a control object position output increment Δy(i−K) for K (K≧0) samples previously and outputs a speed instruction v(i) to a control object speed controller so that the position output of a control object coincides with a target position instruction, characterized in that said preview control apparatus comprises:

means for storing a target position instruction increment, a preview control constant, a past speed instruction and a past control object position output increment;

means for obtaining a position deviation; and means for obtaining a current time speed instruction v(i) according to $$v(i) = \sum_{m=-k+1}^{M} v_m \Delta r(i+m) - Q_0 \Delta y(i-K) + Q_1 \Delta y(i-K-1) -$$

$$\sum_{n=1}^{N+K} g_n v(i-n) + Ee(i-K)$$

where $v_m$, $Q_0$, $Q_1$, $g_n$ and E are preview control constants.

30. A preview control apparatus according to claim 28, characterized by further comprising:

means for storing a target position instruction increment, a preview control constant, a past speed instruction and/or increment and a past control object position output increment;

means for obtaining position deviation; and means for obtaining a current time speed instruction v(i) according to $$v(i) = \sum_{m=-k+1}^{M} v_m \Delta r(i+m) - Q_0 \Delta y(i-K) +$$
$$Q_1 \Delta y(i-K-1) - g_1 v(i-1) +$$
$$\sum_{n=1}^{N+K-1} g_{n+1} \Delta v(i-n) + Ee(i-K)$$

where $v_m$, $Q_0$, $Q_1$, $g_n$ and E are preview control constants.

31. A preview control apparatus which takes as its input with respect to a current time i, a target speed instruction increment $\Delta r(i+M)$ for M samples in the future and a control object speed output increment $\Delta y(i-K)$ for K ($K \geq 0$) samples previously and outputs an acceleration or torque instruction $v(i)$ to a control object acceleration or torque controller so that the speed output of a control object coincides with a target speed instruction characterized in that said preview control apparatus comprises:

means for storing a target speed instruction increment, a preview control constant, a past acceleration or torque instruction and a past control object speed output increment;

means for obtaining a speed deviation; and means for obtaining a current acceleration or torque instruction $v(i)$ according to $$v(i) = \sum_{m=-k+1}^{M} v_m \Delta r(i+m) - Q_0 \Delta y(i-K) +$$
$$Q_1 \Delta y(i-K-1) - \sum_{n=1}^{N+K} g_n v(i-n) + Ee(i-K)$$

where $v_m$, $Q_0$, $Q_1$, $g_n$ and E are preview control constants.

32. A preview control apparatus according to claim 31, characterized by further comprising:

means for storing a target speed instruction increment, a preview control constant, a past acceleration or torque instruction and/or increment and a past control object speed output increment;

means for obtaining speed deviation; and means for obtaining a current time acceleration or torque instruction $v(i)$ according to $$v(i) = \sum_{m=-k+1}^{M} v_m \Delta r(i+m) - Q_0 \Delta y(i-K) +$$
$$Q_1 \Delta y(i-K-1) - g_1 v(i-1) +$$
$$\sum_{n=1}^{N+K-1} g_{n+1} \Delta v(i-n) + Ee(i-K)$$

where $v_m$, $Q_0$, $Q_1$, $g_n$ and E are preview control constants.

33. A preview control apparatus which takes as its input with respect to a current time i, a target speed instruction $\Delta r(i+M)$ for M samples in the future and a control object output increment $\Delta y(i-K)$ for K ($K \geq 0$) samples previously and outputs a control input $u(i)$ to a control object so that the output of a control object coincides with a target instruction, characterized in that said preview control apparatus comprises:

means for storing a target speed instruction increment, a preview control constant, a past control input increment and a past control object output increment;

means for obtaining deviation; and means for obtaining a current control input increment $\Delta u(i)$ according to $$\Delta u(i) = \sum_{m=-k+1}^{M} v_m \Delta r(i+m) - Q_0 \Delta y(i-K) +$$
$$Q_1 \Delta y(i-K-1) - \sum_{n=1}^{N+K} g_n \Delta u(i-n) + Ee(i-K)$$

where $v_m$, $Q_0$, $Q_1$, $g_n$ and E are preview control constants.

34. A preview control apparatus which takes as its input with respect to a current time i, a target speed instruction $r(i+M)$ for M samples in the future and a control object speed output $y(i-K)$ for $K(K \geq 0)$ samples previously and outputs an acceleration or torque instruction $u(i)$ to a control object acceleration or torque controller so that the speed output of a control object coincides with a target speed instruction, characterized in that said preview control apparatus comprises:

means for storing a target speed instruction, a preview control constant, a past acceleration or torque instruction;

means for obtaining a speed deviation; and means for obtaining a current acceleration or torque instruction $u(i)$ according to $$u(i) = \sum_{m=1}^{M} q_m r(i+m) - Qy(i-K) - \sum_{n=1}^{N+K-1} g_n u(i-n) + Ee(i-K)$$

where $q_m$, Q, $g_n$ and E are preview control constants.

35. A preview control apparatus which takes as its input with respect to a current time i, a target speed instruction increment $\Delta r(i+M)$ for M samples in the future and a control object speed output increment $\Delta y(i-K)$ for $K(K \geq 0)$ samples previously and outputs an acceleration or torque instruction $u(i)$ to a control object acceleration or torque controller so that the speed output of a control object coincides with a target speed instruction, characterized in that said preview control apparatus comprises:

means for storing a target speed instruction increment, a preview control constant and a past acceleration or torque instruction;

means for obtaining a speed deviation;

means for obtaining a current acceleration or torque instruction increment $\Delta u(i)$ according to $$\Delta u(i) = \sum_{m=-k+1}^{M} v_m \Delta r(i+m) - Q\Delta y(i-K) -$$
$$\sum_{n=1}^{N+K-1} g_n \Delta u(i-n) + Ee(i-K) - Fu(i-1)$$

where $v_m$, Q, $g_n$, E and F are preview control constants; and means for integrating $\Delta u(i)$ to give an acceleration or torque instruction $u(i)$.

36. A preview control apparatus which takes as its input with respect to a current time i, a target speed instruction increment $\Delta r(i+M)$ for M samples in the future and a control object speed output increment $\Delta y(i-K)$ for $K(K \geq 0)$ samples previously and outputs an acceleration or torque instruction $u(i)$ to a control object acceleration or torque controller so that the speed output of a control object coincides with a target speed instruction, characterized in that said preview control apparatus comprises:

means for storing a target speed instruction increment, a preview control constant and a past acceleration or torque instruction;

means for obtaining a speed deviation; and means for deciding a current acceleration or torque instruction u(i) according to $$u(i) = \sum_{m=-k+1}^{M} v_m \Delta r(i+m) - \sum_{n=1}^{N+K-1} g_n u(i-n) + Ee(i-K)$$

where $v_m$, Q, $g_n$ and E are preview control constants.

37. A preview control apparatus which takes as its input with respect to a current time i, a target speed instruction increment $\Delta r(i+M)$ for M samples in the future and a control object speed output increment $\Delta y(i-K)$ for $K(K \geq 0)$ samples previously and outputs an acceleration or torque instruction u(i) to a control object acceleration or torque controller so that the speed output of a control object coincides with a target speed instruction characterized in that said preview control apparatus comprises:

means for storing a target speed instruction increment, a preview control constant, a past acceleration or torque instruction and a past acceleration or torque instruction increment;

means for obtaining a speed deviation; and means for deciding a current acceleration or torque instruction u(i) according to $$u(i) = \sum_{m=-k+1}^{M} v_m \Delta r(i+m) - g_1 u(i-1) + \sum_{n=1}^{N+K-2} g_{n+1} \Delta u(i-n) + Ee(i-K)$$

where $v_m$, Q, $g_n$ and E are preview control constants.

38. A preview control apparatus which takes as its input with respect to a current time i, a target instruction increment $\Delta r(i+M)$ for M samples in the future and and a control object output increment $\Delta y(i-K)$ for $K(K \geq 0)$ samples previously and outputs a control input u(i) to a control object so that the output of the control object having a transfer function model $$G_p(z) = \frac{b_1 z^{-1} + \ldots + b_{Nb} z^{-Nb}}{1 - a_1 z^{-1} - \ldots - a_{Na} z^{-Na}}$$

coincides with a target instruction, characterized in that said preview control apparatus comprises:

means for storing a target instruction increment, a preview control constant, a past output increment and a past control input increment;

means for obtaining a deviation e(i−K) from a target instruction increment and a control object output increment;

means for deciding a current time control input increment $\Delta u(i)$ according to $$\Delta u(i) = \sum_{m=-k+1}^{M} v_m \Delta r(i+m) + \sum_{n=0}^{Na-1} p_n \Delta y(i-K-n) + Ee(i-K) - \sum_{n=1}^{Nb+K-1} g_n \Delta u(i-n)$$

where $v_m$, $p_n$, E and $g_n$ are preview control constants; and means for obtaining a control input u(i) from $\Delta u(i)$.

39. A preview control apparatus according to claim 38, further characterized by:

means for storing a past control input; and means for deciding a control input increment $\Delta u(i)$ from $$\Delta u(i) = \sum_{m=-k+1}^{M} V_m \Delta r(i+m) - \sum_{n=0}^{Na-1} p_n \Delta y(i-K-n) + Ee(i-K) - \sum_{n=1}^{Nb+K-1} g_n \Delta u(i-n) - Fu(i-1)$$

where $V_m$, $p_n$, E, $g_n$ and F are preview control constants.

40. A preview control apparatus according to claim 3, 5, 14, 23, 26 or 34, characterized in that the right hand side of the equation for deciding the control signal $$\sum_{m=1}^{M} q_m r(i+m)$$

becomes $$\sum_{m=-kf+1}^{M+kf} q'_m r(i+m)$$

where $$q'_m = \sum_{j=1}^{M} q_j f_{m-j} \quad f_n = 0 \quad (n < -k_f, n > k_f)$$

and $f_n$ is the $(2k_f+1)$nth filter coefficient.

41. A preview control apparatus according to claim 7, 12, 16, 18, 29, 30, 31, 32, 33, 35, 36, 37, 38 or 39, characterized in that the right hand side of the equation for deciding the control signal $$\sum_{m=-K+1}^{M} v_m \Delta r(i+m)$$

becomes $$\sum_{m=-kf-k+1}^{M+kf} v'_m \Delta r(i+m)$$

where $$v'_m = \sum_{j=1}^{M} v_j f_{m-j} \quad f_n = 0 \quad (n < -k_f, n > k_f)$$

and $f_n$ is the $(2k_f+1)$nth filter coefficient.

42. A preview control apparatus for generating a control input applied to a control object each predetermined sampling period, said preview control apparatus comprising:

means for inputting a future target instruction and a control object output;

means for storing a group of data consisting essentially of said future target instruction, and at least one preview control constant and past control input;

means for determining a future deviation estimate using said future target instruction, said preview control constant and said past control input based on a model of said control object; and means for calculating said control input to be outputted to said control object from inputs including said future target instruction, said control object output, said past control input, said future deviation, and the model of said control object to minimize an evaluation function including at least a squared weighting of said future deviation estimate.

43. A preview control apparatus for applying a control input to a control object having two constituent integral portions between its input and output, to produce a control object output coinciding with a target instruction, the preview control apparatus comprising:

means for inputting a future target instruction and a control object output:

storage means for a group of data consisting essentially of said future target instruction, preview control constants and a past control input;

means for determining a deviation from a target instruction and a control object output; and means for calculating a control input from information from a group consisting essentially of the deviation, future target instruction, control object output, past control input, and control object motion characteristics, to set an evaluation function derived from a squared weighting of the future deviation estimate and the control input to a minimum.

* * * * *